US010484216B2

(12) United States Patent
Qian et al.

(10) Patent No.: US 10,484,216 B2
(45) Date of Patent: Nov. 19, 2019

(54) FILTERING-BASED SIGNAL TRANSMISSION AND RECEIVING METHODS AND CORRESPONDING TRANSMITTER AND RECEIVER

(71) Applicant: Samsung Electronics Co., Ltd., Suwon-si, Gyeonggi-do (KR)

(72) Inventors: Chen Qian, Beijing (CN); Bin Yu, Beijing (CN); Yeohun Yun, Hwaseong-si (KR); Qi Xiong, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/448,043

(22) Filed: Mar. 2, 2017

(65) Prior Publication Data
US 2017/0257238 A1    Sep. 7, 2017

(30) Foreign Application Priority Data

Mar. 3, 2016   (CN) .......................... 2016 1 0122134
Aug. 11, 2016  (CN) .......................... 2016 1 0658770

(51) Int. Cl.
*H04L 27/04*    (2006.01)
*H04L 27/26*    (2006.01)
*H04B 7/06*     (2006.01)

(52) U.S. Cl.
CPC .......... *H04L 27/04* (2013.01); *H04B 7/0626* (2013.01); *H04L 27/2607* (2013.01); *H04L 27/2628* (2013.01)

(58) Field of Classification Search
CPC ............ H04L 27/2607; H04L 27/2626; H04L 5/0007
See application file for complete search history.

(56) References Cited

U.S. PATENT DOCUMENTS

| 6,687,307 | B1 * | 2/2004 | Anikhindi | .......... H04L 27/2607 |
| | | | | 375/260 |
| 7,421,013 | B1 * | 9/2008 | Lee | ..................... H04L 27/2657 |
| | | | | 370/252 |
| 2007/0002726 | A1 * | 1/2007 | Zangi | ................ H04L 27/2607 |
| | | | | 370/208 |
| 2008/0002645 | A1 * | 1/2008 | Seki | ................... H04L 25/03834 |
| | | | | 370/338 |

(Continued)

*Primary Examiner* — Aristocratis Fotakis
(74) *Attorney, Agent, or Firm* — Jefferson IP Law, LLP

(57) ABSTRACT

A filtering-based signal transmission method is provided. The method includes a transmitter performing carrier modulation on each signal from at least one sub-band, and adding a cyclic prefix and a cyclic postfix thereto, respectively, performing time-domain filtering on the signal, added with the cyclic prefix and the cyclic postfix, from the respective sub-band, and transmitting the filtered signal from the at least one sub-band. The present disclosure further provides a filtering-based signal receiving method. The filtering-based signal receiving method includes performing, by a receiver, time-domain matched filtering, corresponding to at least one sub-band, on each received signal, removing, by the receiver, a cyclic prefix and a cyclic postfix from the filtered signal from the at least one sub-band, and performing carrier demodulation, respectively, and detecting and estimating, by the receiver, the demodulated signal from the at least one sub-band.

18 Claims, 24 Drawing Sheets

(56) References Cited

U.S. PATENT DOCUMENTS

| | | |
|---|---|---|
| 2012/0209900 A1 | 8/2012 | Sorokine et al. |
| 2014/0161030 A1* | 6/2014 | Lopez ................... H04L 23/02 |
| | | 370/328 |
| 2014/0348252 A1 | 11/2014 | Siohan et al. |
| 2015/0023439 A1 | 1/2015 | Dimou et al. |
| 2015/0304146 A1* | 10/2015 | Yang ................... H04L 5/0066 |
| | | 370/329 |
| 2015/0326418 A1 | 11/2015 | Liu et al. |
| 2015/0372843 A1* | 12/2015 | Bala ................. H04L 25/03834 |
| | | 375/295 |
| 2016/0006464 A1 | 1/2016 | Stadelmeier et al. |
| 2016/0142292 A1* | 5/2016 | Au ....................... H04L 5/0007 |
| | | 370/352 |
| 2016/0149743 A1* | 5/2016 | Rong ................... H04B 7/0452 |
| | | 370/329 |
| 2016/0192353 A1* | 6/2016 | Abdoli ................. H04L 27/264 |
| | | 370/336 |
| 2016/0352551 A1* | 12/2016 | Zhang ................ H04L 27/2602 |
| 2017/0118054 A1* | 4/2017 | Ma ..................... H04L 27/2607 |
| 2017/0215170 A1* | 7/2017 | Islam ................. H04L 27/2601 |

* cited by examiner

FILTERING-BASED SIGNAL TRANSMISSION AND RECEIVING METHODS AND CORRESPONDING TRANSMITTER AND RECEIVER

CROSS-REFERENCE TO RELATED APPLICATION(S)

This application claims the benefit under 35 U.S.C. § 119(a) of a Chinese patent application filed on Mar. 3, 2016 in the Chinese Intellectual Property Office and assigned Serial number 201610122134.X, and of a Chinese patent application filed on Aug. 11, 2016 in the Chinese Intellectual Property Office and assigned Serial number 201610658770.4, the entire disclosure of each of which is hereby incorporated by reference.

TECHNICAL FIELD

The present disclosure relates to the field of mobile communication. More particularly, the present disclosure relates to a filtering-based signal transmission method, a filtering-based signal receiving method, a corresponding filtering-based transmitter and receiver, and a communication method based on signal adjustment.

BACKGROUND

The rapid development of information industry, particularly the increasing demand from the mobile Internet and the Internet of things (IoT), brings about unprecedented challenges in the future mobile communications technology. According to the *ITU-R M. [IMT.BEYOND 2020.TRAFFIC]* issued by the International Telecommunication Union (ITU), it can be expected that, by 2020, mobile services traffic will grow nearly 1,000 times as compared with that in 2010 (fourth generation (4G) era), and the number of user device connections will also be over 17 billion, and with a vast number of IoT devices gradually expand into the mobile communication network, the number of connected devices will be even more astonishing. In response to this unprecedented challenge, the communications industry and academia have prepared for 2020s by launching an extensive study of the fifth generation of mobile communications technology (fifth generation (5G)). Currently, in *ITU-R M. [IMT.VISION]* from ITU, the framework and overall objectives of the future 5G have been discussed, where the demands outlook, application scenarios and various important performance indexes of 5G have been described in detail. In terms of new demands in 5G, the *ITU-R M. [IMT.FUTURE TECHNOLOGY TRENDS]* from ITU provides information related to the 5G technology trends, which is intended to address prominent issues, such as significant improvement on system throughput, consistency of the user experience, scalability so as to support IoT, delay, energy efficiency, cost, network flexibility, support for new services and flexible spectrum utilization, and the like.

Modulation waveform and multiple access are important foundations for designing wireless communication air-interfaces, and 5G will be no exception. At present, the typical example orthogonal frequency division multiplexing (OFDM) in the multi-carrier modulation (MCM) technological family has been widely used in the broadcasting-type audio and video fields and the communication systems for civilian use, for example, the long term evolution (LTE) systems corresponding to the evolved universal terrestrial radio access (E-UTRA) developed by the 3rd generation partnership project (3GPP), European digital video broadcasting (DVB) and digital audio broadcasting (DAB), very-high-bit-rate digital subscriber loop (VDSL), institute of electrical and electronics engineers (IEEE) 802.11a/g wireless local area network (WLAN), IEEE802.22 wireless regional area network (WRAN) and IEEE802.16 world interoperability for microwave access (WiMAX) and more. The basic idea of the OFDM technology is to divide a broadband channel into multiple parallel narrow-band sub-channels or sub-carriers, so that a high-speed data stream transmitted in a frequency selective fading channel becomes low-speed data streams transmitted in the multiple parallel, independent and flat-fading sub-channels. In this way, the capability of the system against the multipath fading is greatly enhanced, and OFDM can realize simplified multi-carrier modulation and demodulation by use of inverse fast fourier transform (IFFT) and fast fourier transform (FFT), and then, by adding a cyclic prefix (CP), the linear convolution with the channel becomes circular convolution, and as a result, according to the properties of the circular convolution, when the length of the CP is larger than the maximum multipath time delay of the channel, the inter-symbol interference (ISI) free reception can be realized by the simple single-tap frequency-domain equalization, and the processing complexity of the receiver is thus reduced.

Although CP-OFDM-based waveform can well support the service requirements of mobile broadband (MBB) in 4G era, CP-OFDM shows great restrictions or deficiencies in application scenarios of 5G since 5G will face more challenging and various scenarios. Such restrictions or deficiencies are mainly manifested in the following. First, adding a CP to combat ISI will greatly decrease the spectrum efficiency in 5G low-delay transmission scenarios. This is because low-delay transmission will greatly shorten the symbol length of OFDM, while the length of the CP is only limited by the impulse response of the channel, and in this case a ratio of the length of the CP to the symbol length of OFDM will be greatly increased. As a result, such an overhead causes very large spectrum efficiency loss. Low spectrum utilization is unacceptable. Second, the strict time synchronization requirement will cause a large signaling overhead required by closed-loop synchronization maintenance in IoT scenarios of 5G, and due to the strict synchronization mechanism, the structure of the data frames is not flexible so that it is unable to well support different synchronization requirements of various service. Third, the use of rectangular pulse shaping in OFDM will slow down the frequency-domain side-lobe roll-off and thus result in high out-of-band (OOB) emission. Hence, OFDM is quite sensitive to carrier frequency offset (CFO). However, as for 5G, there will be many demands for flexible access and sharing of fragmented spectrum, the high OOB emission of OFDM significantly restricts the flexibility of spectrum access, or in other words, requires a very large frequency-domain guard band, and as a result, the utilization of spectrum is reduced. Those problems are mainly caused by its inherent characteristics. Although the influence of those problems can be reduced by taking some measures, the complexity of system design will be increased, and it is unable to address those issues fundamentally.

To this end, as described in a report ITU-R M.[IMT.FU-TURE TECHNOLOGY TRENDS] from the ITU, some new waveform modulation technologies, for example, multi-carrier-based modulation, have been taken into the consideration of 5G. Among others, the filtered-OFDM (F-OFDM) modulation technology becomes one of the research focuses. The F-OFDM technology introduces time-domain filtering based on OFDM. By the design of a time-domain filter, F-OFDM can significantly reduce the OOB emission caused by filtering of the time-domain rectangular window, and also inherit some unique advantages of OFDM, for example, protection against frequency selective fading by adding a CP based on the complex field orthogonality between the sub-carriers, and the like. Good suppression against the OOB emission can well support the fragmented spectrum. Meanwhile, compared with other new waveform modulation technologies, such as filter-bank multi-carrier (FBMC), by the complex field orthogonality between the sub-carriers, F-OFDM can provide better support to fading channels and multi-antenna systems. F-OFDM supports sub-band filtering, that is, the available band can be divided into non-overlapped sub-bands, and the sub-bands can use a different multi-carrier modulation parameter comprising sub-carrier spacing, CP length or more. In order to avoid the interference between sub-bands, several or no sub-carriers can be inserted between different sub-bands as guard bands which are allocated to different services or different users. The filtering based on sub-bands improves the spectrum utilization of the system and the flexibility of use of spectrum.

Due to the above excellent properties, F-OFDM becomes one of new waveform modulation technological candidates of 5G. However, F-OFDM itself has some problems. Specifically, for F-OFDM, time-domain filtering is performed on OFDM symbols added with a CP, and as a result, the filtered OFDM symbols are extended in time-domain. Meanwhile, in order to improve the performance of reducing the OOB emission of F-OFDM, a long time-domain filter is usually used. For example, in the publication [Filtered OFDM: A New Waveform for Future Wireless Systems], the length of the used time-domain filter is half of that of OFDM symbols. Consequently, the ISI is caused between the adjacent symbols, and the system bit error rate (BER) performance is degraded. Although the influence of this problem can be mitigated by designing a time-domain filter that the main energy of the filter is concentrated within a certain range, in some scenarios, for example, when the bandwidth of a sub-band is narrow or when the used symbol modulation order is high, the effect of ISI caused by the extension of symbols in time-domain due to filtering cannot be ignored, or even worse, may result in an error floor.

In conclusion, in order to improve the competitiveness of F-OFDM as technological candidates of 5G, it is necessary to address its deficiencies in addition to development of its advantageous features. For various scenarios in 5G, particularly for the narrow-band service transmission methods or more in IoT scenarios, it is very necessary to address the ISI caused by the extension of symbols due to time-domain filtering to wireless communication systems in F-OFDM.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a filtering-based signal transmission method, a filtering-based signal receiving method, a corresponding filtering-based transmitter and receiver, and a communication method based on signal adjustment.

In order to effectively address the issue of inter-symbol interference (ISI) caused by the symbol extension due to time-domain filtering of filtered orthogonal frequency division multiplexing (F-OFDM), in accordance with an aspect of the present disclosure, a filtering-based signal transmission method is provided. The method includes performing, by a transmitter, carrier modulation on each signal from at least one sub-band, and adding a cyclic prefix and a cyclic postfix thereto, respectively, performing, by the transmitter, time-domain filtering on the signal, added with the cyclic prefix and the cyclic postfix, from the respective sub-band, and transmitting the filtered signal from the at least one sub-band.

In an implementation, the transmitter performs carrier modulation on the signal from the respective sub-band according to a carrier modulation parameter corresponding to the respective sub-band, and adds a cyclic prefix and a cyclic postfix thereto, respectively.

The carrier modulation parameter comprises at least any one of sub-carrier spacing, length of a cyclic prefix, length of a cyclic postfix, and total length of a cyclic prefix and a cyclic postfix.

In an implementation, performing, by the transmitter, carrier modulation on each signal from at least one sub-band specifically comprising by a transmitter, performing channel coding and symbol modulation on each input signal from at least one sub-band, and performing carrier modulation on the coded and modulated signal.

In an implementation, channel coding and symbol modulation are performed on signals from any two of the sub-bands with a same or different modulation and coding scheme (MCS).

In an implementation, carrier modulation is performed on signals from any two of the sub-bands by using a same or different carrier modulation parameter, and the cyclic prefix and the cyclic postfix are added thereto, respectively.

In an implementation, adding a cyclic prefix and a cyclic postfix to the signal from the respective sub-band specifically comprising extracting, according to a first pre-defined symbol number corresponding to length of a cyclic prefix of any of the sub-bands, the last first pre-defined symbol number of symbols in the carrier modulated signal corresponding to the sub-band, and adding, in an order of symbols, the extracted symbols before the carrier modulated signal as a cyclic prefix, and extracting, according to a second pre-defined symbol number corresponding to length of a cyclic postfix of any of the sub-bands, the previous second pre-defined symbol number of symbols in the carrier modulated signal corresponding to the sub-band, and adding, in an order of symbols, the extracted symbols after the carrier modulated signal as a cyclic postfix.

In an implementation, transmitting the filtered signal from the one or more sub-bands specifically comprising when there is only one sub-band, transmitting directly the filtered signal from the sub-band, or when there are multiple sub-bands, superposing the filtered signal from each sub-band, and transmitting the superposed signal.

In an implementation, the transmitter determines length of a cyclic prefix and length of a cyclic postfix according to bandwidth corresponding to a respective sub-band, downlink channel state information and symbol modulation.

Optionally, the transmitter receives downlink channel state information corresponding to the respective sub-band transmitted by a receiver.

Optionally, the transmitter performs uplink channel estimation, according to a sounding reference signal of the respective sub-band transmitted by a receiver, to determine uplink channel state information corresponding to the respective sub-band, and determines downlink channel state information corresponding to the respective sub-band, based on the uplink channel state information corresponding to the respective sub-band.

In an implementation, the transmitter transmits indication information of a cyclic prefix and a cyclic postfix to a receiver, wherein the indication information of a cyclic prefix and a cyclic postfix comprises at least any one of a ratio of length of a cyclic prefix to length of a cyclic postfix, a ratio of length of a cyclic prefix to total length of the cyclic prefix and a cyclic postfix, ratio of length of a cyclic postfix to total length of a cyclic prefix and the cyclic postfix, length of a cyclic prefix, and length of a cyclic postfix, wherein the indication information of a cyclic prefix and a cyclic postfix is used for determining length of the cyclic prefix and length of the cyclic postfix.

In an implementation, the transmitter receives indication information of a cyclic prefix and a cyclic postfix transmitted by a receiver, and determines length of the cyclic prefix and length of the cyclic postfix according to the indication information of the cyclic prefix and the cyclic postfix and total length of the cyclic prefix and the cyclic postfix.

In an implementation, the transmitter adjusts length of a cyclic prefix and length of a cyclic postfix according to the power relationship between carrier modulated symbols.

In an implementation, adjusting length of a cyclic prefix and length of a cyclic postfix according to the power relationship between carrier modulated symbols comprises any one of when the power of a carrier modulated symbol is higher than a pre-defined power threshold of two adjacent carrier modulated symbols thereto, increasing the ratio of length of a cyclic prefix or cyclic postfix on a side, close to a high-power carrier modulated symbol, of the two adjacent carrier modulated symbols, in total length of a cyclic prefix and a cyclic postfix, and when a carrier modulated symbol is not used for data transmission, increasing the ratio of length of a cyclic prefix or cyclic postfix on a side, away from the carrier modulated symbol, of the two adjacent carrier modulated symbols, in total length of a cyclic prefix and a cyclic postfix.

In accordance with another aspect of the present disclosure, a filtering-based signal receiving method is provided. The filtering-based signal receiving method includes by a receiver, performing time-domain matched filtering, corresponding to one or more sub-bands, on each received signal, removing a cyclic prefix and a cyclic postfix from the filtered signal from the one or more sub-bands, and performing carrier demodulation, respectively, and detecting and estimating the demodulated signal from the one or more sub-bands.

In an implementation, the receiver removes a cyclic prefix and a cyclic postfix from the filtered signal from the one or more sub-bands according to a carrier modulation parameter corresponding to the one or more sub-bands, and performs carrier demodulation, respectively.

The carrier modulation parameter comprises at least any one of sub-carrier spacing, length of a cyclic prefix, length of a cyclic postfix, and total length of a cyclic prefix and a cyclic postfix.

In an implementation, removing the cyclic prefix and the cyclic postfix from the filtered signal from the one or more sub-bands specifically comprises according to length of a cyclic prefix and/or length of a cyclic postfix of the one or more sub-bands, extracting, by means of windowing, a signal removed off the cyclic prefix and the cyclic postfix.

In an implementation, the demodulated signal from the one or more sub-bands is detected and estimated according to an MCS corresponding to the one or more sub-bands.

Optionally, the receiver determines length of a cyclic prefix and length of a cyclic postfix according to bandwidth of the one or more sub-bands, downlink channel state information and symbol modulation.

In an implementation, the receiver performs channel estimation, according to a downlink reference signal of the one or more sub-band transmitted by a transmitter, to determine downlink channel state information.

Optionally, the receiver receives indication information of a cyclic prefix and a cyclic postfix transmitted by a transmitter and determines length of a cyclic prefix and length of a cyclic postfix according to the indication information of the cyclic prefix and the cyclic postfix.

The indication information of a cyclic prefix and a cyclic postfix comprises at least any one of a ratio of length of a cyclic prefix to length of a cyclic postfix, a ratio of length of a cyclic prefix to total length of the cyclic prefix and a cyclic postfix, a ratio of length of a cyclic postfix to total length of a cyclic prefix and the cyclic postfix, length of a cyclic prefix, and length of a cyclic postfix.

In accordance with another aspect of the present disclosure, a filtering-based transmitter is provided. The filtering-based transmitter includes a carrier modulation device configured to perform carrier modulation on each signal from one or more sub-bands, and add a cyclic prefix and a cyclic postfix thereto, respectively, a filtering device configured to perform time-domain filtering on the signal, added with the cyclic prefix and the cyclic postfix, from the respective sub-band, and a transceiver configured to transmit the filtered signal from the one or more sub-bands.

In accordance with another aspect of the present disclosure, a filtering-based receiver is provided. The filtering-based receiver includes a matched filtering device configured to perform time-domain matched filtering, corresponding to one or more sub-bands, on each received signal, a carrier demodulation device configured to remove a cyclic prefix and a cyclic postfix from the filtered signal from the one or more sub-bands, and perform carrier demodulation, respectively, and an estimation device configured to detect and estimate the demodulated signal from the one or more sub-bands.

In accordance with another aspect of the present disclosure, a communication method based on signal adjustment is provided. The method includes by a terminal equipment, adjusting length of a cyclic prefix and/or a cyclic postfix of a corresponding sub-band, according to the received system information in combination with total length of the cyclic prefix and the cyclic postfix detected during downlink synchronization, and performing communication with a base station equipment through signals with the adjusted length of the cyclic prefix and/or length of the cyclic postfix from the respective sub-band.

In an implementation, the system information comprises sub-band bandwidth and sub-carrier spacing of the respective sub-band, wherein adjusting, by a terminal equipment, length of a cyclic prefix and/or a cyclic postfix of a corresponding sub-band, according to the received system information in combination with total length of the cyclic prefix and the cyclic postfix detected during downlink synchronization, comprising determining length information of a cyclic prefix and/or a cyclic postfix, according to the sub-band bandwidth and sub-carrier spacing of the respective sub-band, and adjusting length of the cyclic prefix and/or length of the cyclic postfix corresponding to the corresponding sub-band, according to the determined length information of the cyclic prefix and/or the cyclic postfix in combination with total length of the cyclic prefix and the cyclic postfix detected during downlink synchronization.

Optionally, the length information comprises at least one of the following length of a cyclic prefix, length of a cyclic postfix, a ratio of length of a cyclic prefix to length of a cyclic postfix, a ratio of length of a cyclic prefix to total length of the cyclic prefix and a cyclic postfix, and a ratio of length of a cyclic postfix to total length of a cyclic prefix and the cyclic postfix.

In an implementation, adjusting, by a terminal equipment, length of a cyclic prefix and/or a cyclic postfix of a corresponding sub-band, according to the received system information in combination with total length of the cyclic prefix and the cyclic postfix detected during downlink synchronization, comprising by the terminal equipment, determining location information of a receiver detection window corresponding to the corresponding sub-band bandwidth and sub-carrier spacing, according to the received system information, and adjusting length of the cyclic prefix and/or length of the cyclic postfix of the corresponding sub-band, according to the location information of the receiver detection window in combination with total length of the cyclic prefix and the cyclic postfix detected during downlink synchronization.

In an implementation, the method further comprises adjusting, by the terminal equipment, length of a cyclic prefix and/or length of a cyclic postfix correspondingly, according to adjustment amount of length of the cyclic prefix and/or length of the cyclic postfix received from the base station equipment.

In an implementation, receiving the adjustment amount of length of the cyclic prefix and/or length of the cyclic postfix from the base station equipment comprising at least one of the following by the terminal equipment, deciding whether length of a cyclic prefix and/or a cyclic postfix is required to be adjusted according to a result of channel estimation, if so, transmitting an adjustment request to the base station equipment, and receiving the adjustment amount of length of the cyclic prefix and/or length of the cyclic postfix fed back by the base station equipment for responding to the adjustment request, and receiving the adjustment amount of length of the cyclic prefix and/or length of the cyclic postfix, which is determined and transmitted by the base station equipment based on the degree of channel frequency selective fading fed back by the base station equipment.

In accordance with another aspect of the present disclosure, a communication method based on signal adjustment is provided. The communication method includes by a base station equipment, transmitting system information containing length information of a cyclic prefix and/or a cyclic postfix corresponding to a respective sub-band, and performing communication with a user equipment through signals satisfying the length information of the cyclic prefix and/or the cyclic postfix corresponding to the respective sub-band.

In an implementation, the base station equipment decides whether length of a cyclic prefix and/or a cyclic postfix is required to be adjusted, according to the received degree of channel frequency selective fading fed back by the user equipment, and if so, the base station equipment transmits the adjustment amount of length of the cyclic prefix and/or length of the cyclic postfix to the user equipment.

In comparison with the F-OFDM systems and single-carrier (SC)-FDMA systems of the related art, in the present disclosure, by adding a cyclic prefix and a cyclic postfix on the transmitter side, most of ISI from adjacent symbols can be eliminated while removing the cyclic prefix and the cyclic postfix on the receiver side, so that the bit error rate (BER) performance of the system is improved and the link stability and link reliability are improved.

The above solutions as provided in the present disclosure just make minor modifications to the existing systems, and hence will not influence the system compatibility. Moreover, the implementations of these solutions as provided are both simple and highly effective.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As shown in FIGS. 1, 2, 3A, and 3B, the implementation of the filtered-orthogonal frequency division multiplexing (F-OFDM) technology will be described briefly now.

Figure 1:
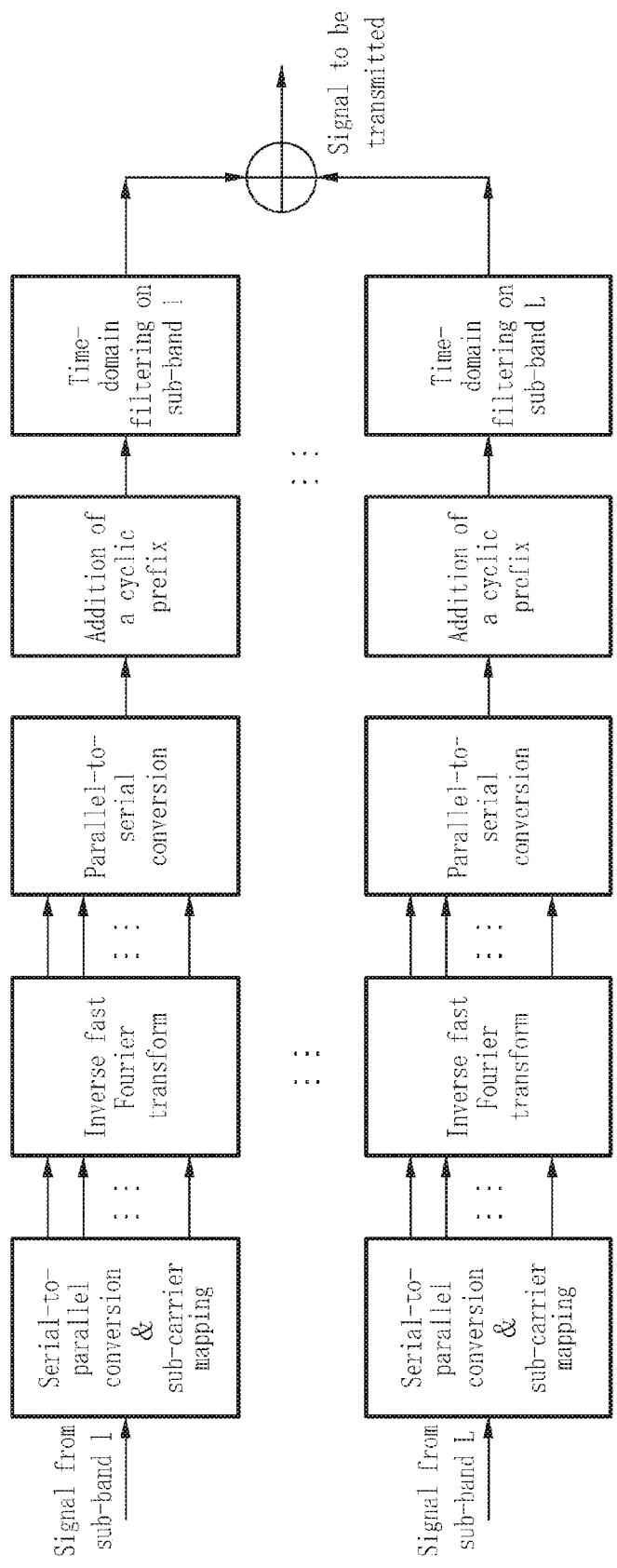
FIG. 1 is a block diagram of a transmitter of a filtering-based orthogonal frequency division multiplexing (OFDM) system according to an embodiment of the present disclosure.

FIG. 1 is a block diagram of a transmitter structure for an F-OFDM technology according to an embodiment of the present disclosure.

Referring to FIG. 1, the available band is divided into L sub-bands based on the service requirements or the category of user equipment to be served, and each sub-band can use a different multi-carrier modulation parameter, for example, different sub-carrier spacing, different cyclic prefix (CP) length, or more. For each sub-band, the input signal is a complex signal having passed through channel coding and symbol modulation, wherein the symbol modulation comprises quadrature amplitude modulation (QAM), phase shift keying (PSK) or more. The complex signal, input by each path of sub-bands, passes through serial-to-parallel conversion and then to sub-carrier mapping according to the sub-carrier locations of the sub-bands, to map the data onto the allocated sub-carriers, and zero-padding is performed on the remaining sub-carriers, and then, N-point inverse fast fourier transform (IFFT) is performed to obtain a time-domain signal. The signal having passed through IFFT passes through parallel-to-serial conversion and then added with a CP, and the CP-OFDM modulation process is completed according to the related art. In order to reduce the interference between sub-bands, time-domain filtering will be performed on each sub-band at the end of the OFDM modulation, that is, each sub-band will be filtered by a time-domain filter to reduce the out-of-band (OOB) emission. In this way, the interference between sub-bands due to a different carrier modulation parameter can be significantly reduced at the cost of a very small guard band.

It is assumed that the vector of data transmitted on the $l^{th}$ sub-band is $s_l=[s_l(0), \ldots, s_l(N_l-1)]^T$, where $s_l(n)$ ($0 \leq n$ and $n \leq N_l-1$) is the $n^{th}$ data symbol, $N_l$ is the number of data transmitted on the $l^{th}$ sub-band. In this case, the signal before the time-domain filtering of the sub-band can be expressed by:

$$x_l = \frac{1}{N} C F_N^H A_l s_l \qquad \text{Equation 1}$$

The matrix $A_l$ is a $N \times N_l$ dimensional matrix, which denotes a sub-carrier mapping matrix on the sub-band l, and is used for mapping $N_l$ effective data on the lth sub-band onto sub-carriers allocated to the lth sub-band. If sub-carriers from $N_1+1$ to $N_2$ are successively allocated to the sub-band l and $N_2-N_1=N_l$, the matrix $A_l$ is:

$$A_l = \begin{bmatrix} 0_{N_1 \times N_l} \\ I_{N_l} \\ 0_{(N-N_l-N_1) \times N_l} \end{bmatrix}$$

The matrix $O_{N_1 \times N_l}$ is a $N_1 \times N_l$ dimensional zero matrix, and $I_{N_l}$ is a $N_l \times N_l$ dimensional identity matrix.

The matrix $F_N$ is a $N \times N$ dimensional FFT matrix which is expressed by:

$$F_N = \begin{bmatrix} W_N^{0 \times 0} & W_N^{0 \times 1} & \cdots & W_N^{0 \times (N-1)} \\ W_N^{1 \times 0} & W_N^{1 \times 1} & \cdots & W_N^{1 \times (N-1)} \\ \vdots & \vdots & \ddots & \vdots \\ W_N^{(N-1) \times 0} & W_N^{(N-1) \times 1} & \cdots & W_N^{(N-1) \times (N-1)} \end{bmatrix}$$

$$W_N = e^{-j\frac{2\pi}{N}},$$

the superscript H represents the operation of conjugate transpose. From the above formula, it can be known that $1/N \, F_N^H$ represents an IFFT operation.

The matrix C is a $(N+N_{CP}) \times N$ dimensional matrix representing the addition of a CP, and length of the cyclic prefix is $N_{CP}$. The matrix C is expressed by:

$$C = \begin{bmatrix} C_{sub} \\ I_N \end{bmatrix}$$

$C_{sub}=[0_{N_{CP}\times(N-N_{CP})}\ I_{N_{CP}}]$, $I_N$ is a $N \times N$ dimensional identity matrix. The addition of a CP is to place the last $N_{CP}$ symbols, among the symbols having passed through IFFT, before a symbol sequence as the cyclic prefix.

If the impulse response of time-domain filter of the $l^{th}$ sub-band is $f_l$, the transmitted signal after the time-domain filtering is:

$$y_l = f_l * x_l$$

* represents linear convolution between sequences. Signals from L sub-bands are superposed to obtain a final transmission signal $y=\Sigma_l y_l$. If the length of impulse response of the time-domain filter is $L_f$, length of the filtered symbols is $N+N_{CP}+L_f-1$. Since symbols are successively transmitted and the filtered symbols are extended in symbol length, inter-symbol interference (ISI) will be caused in adjacent symbols.

Figure 2:
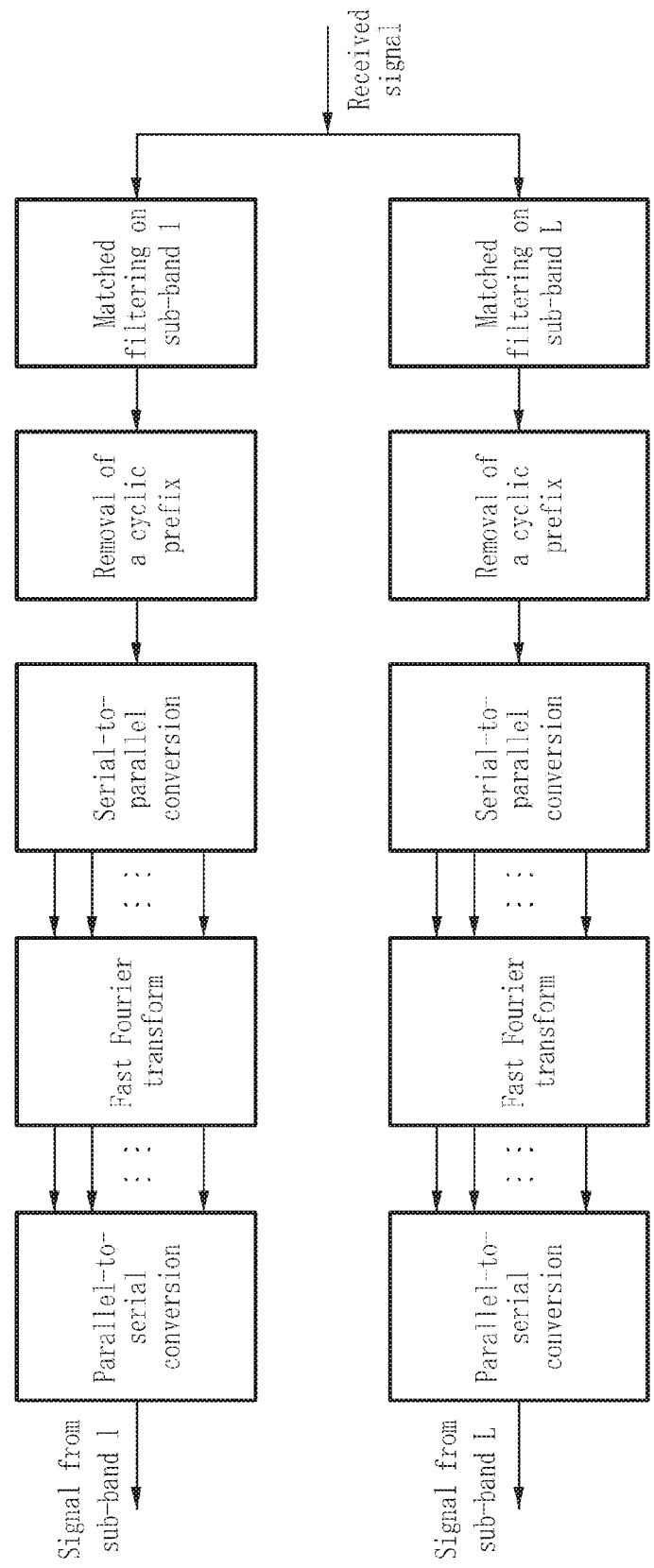
FIG. 2 is a block diagram of a receiver of a filtering-based OFDM system according to an embodiment of the present disclosure.

FIG. 2 is a block diagram of a receiver for a filtering-based OFDM system according to an embodiment of the present disclosure.

Referring to FIG. 2, first, the receiver performs sub-band-level matched filtering on each received signal, performs OFDM demodulation as shown in FIG. 2 on each signal from each sub-band, specifically comprising: removal of a cyclic prefix, serial-to-parallel conversion, discrete Fourier transform, and parallel-to-serial conversion, and finally, determines an estimated value of a signal transmitted by each sub-band. If the time-domain impulse response of the sub-band filter of the $l^{th}$ sub-band is $f_l(n)$, the time-domain impulse response of the corresponding matched filter is $f_l^*(-n)$, where the superscript * represents conjugate operation. A reference signal for channel estimation is inserted prior to the F-OFDM modulation, to estimate the frequency response of an equivalent channel $f_l^*(-n)*h(n)*f_l(n)$ having passed through sub-band filtering and sub-band matched filtering, where h(n) represents the channel impulse response, the operator * represents linear convolution, and the superscript represents complex conjugate operation.

The design of the time-domain filter can be completed by the soft truncation of a sinc function with a window function. For example, based on the sinc function, soft truncation is performed by a Hanning window. The resulting impulse response of time-domain filter and the corresponding frequency-domain response are as shown in FIGS. 3A and 3B.

Figure 3A:
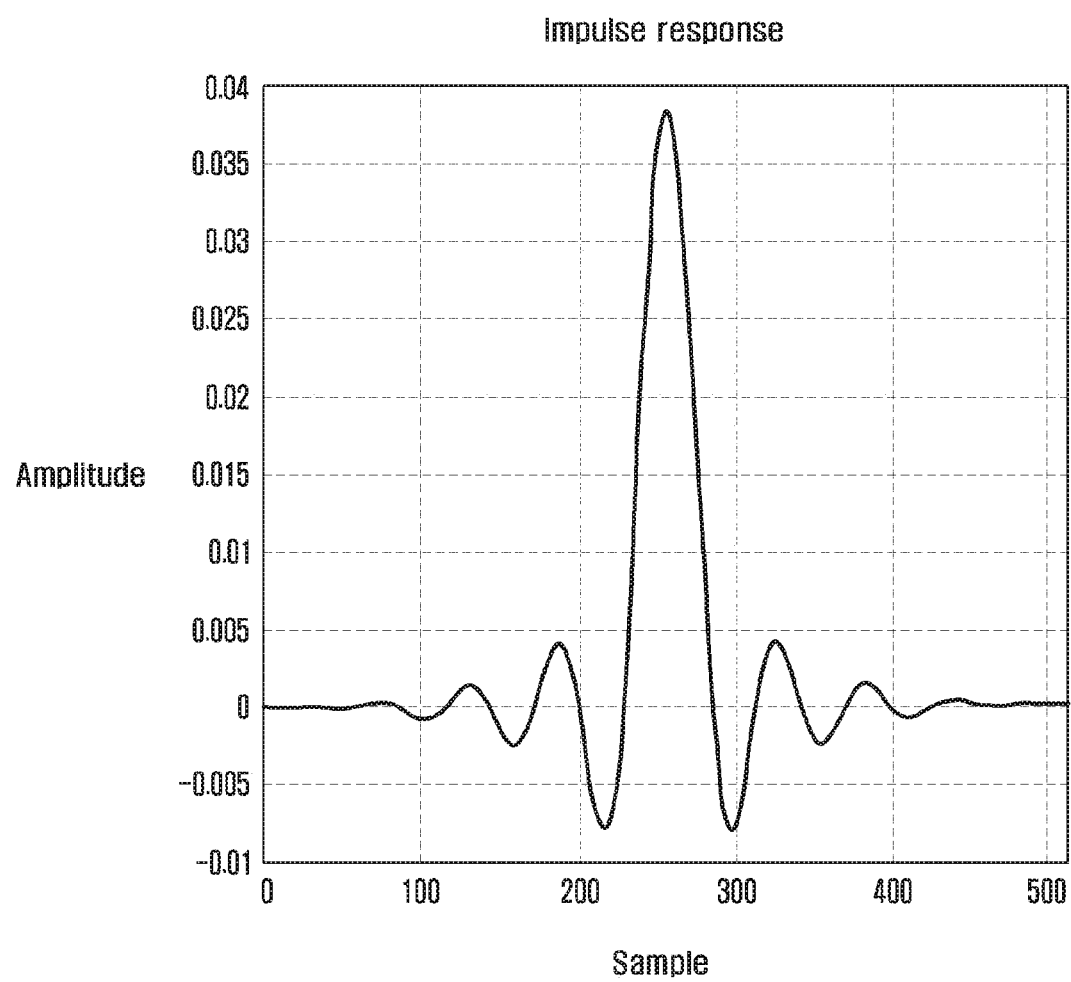
FIGS. 3A and 3B are schematic views of time-domain impulse response and frequency-domain response of a windowing function used in filtered OFDM (F-OFDM) according to an embodiment of the present disclosure.
Figure 3B:
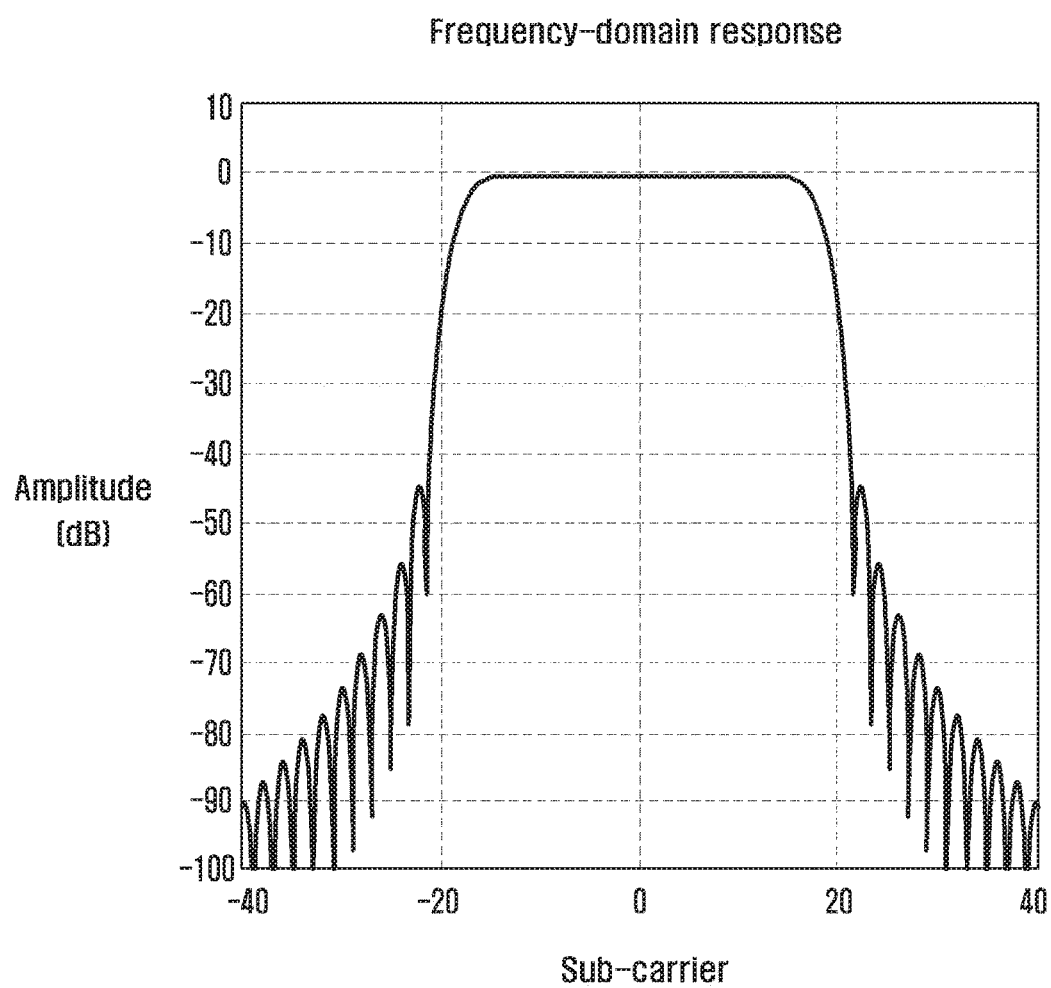

FIGS. 3A and 3B are schematic views of time-domain impulse response and frequency-domain response of a windowing function used in filtered OFDM (F-OFDM) according to an embodiment of the present disclosure.

Referring to FIGS. 3A and 3B, the OOB emission of the window function used in F-OFDM is far less than that of the OFDM system. In this way, sub-band-level filtering can be achieved, where a different sub-band uses a different multi-carrier parameter, for example, different sub-carrier spacing, different CP length or more. FIG. 3A shows the time-domain impulse response h(t) of the used window function, where t represents the sampling time according to an embodiment of the present disclosure. As shown in FIGS. 3A and 3B, this time-domain filter has a long head and tail, and this will cause the extension of time-domain symbols after time-domain filtering and thus result in ISI between a previous symbol and a next symbol. By designing the time-domain filter, the energy of the filter can be concentrated so as to reduce the influence of the extension of time-domain symbols due to filtering. Since the bandwidth of frequency response of the filter determines the energy distribution of the time-domain impulse response, for a system with a wide sub-band bandwidth, the energy of the time-domain filter is more concentrated, and in this case, the influence of the extension of time-domain symbols due to filtering is less. However, for a narrow sub-band bandwidth, the energy of the time-domain filter is scattered, and in this case, the influence of the extension of time-domain symbols will be more significant.

In the present disclosure, in order to reduce the ISI caused by the extension of symbols due to time-domain filtering, the present disclosure provides a flexibly-configured F-OFDM signal transmission way.

Figure 4:
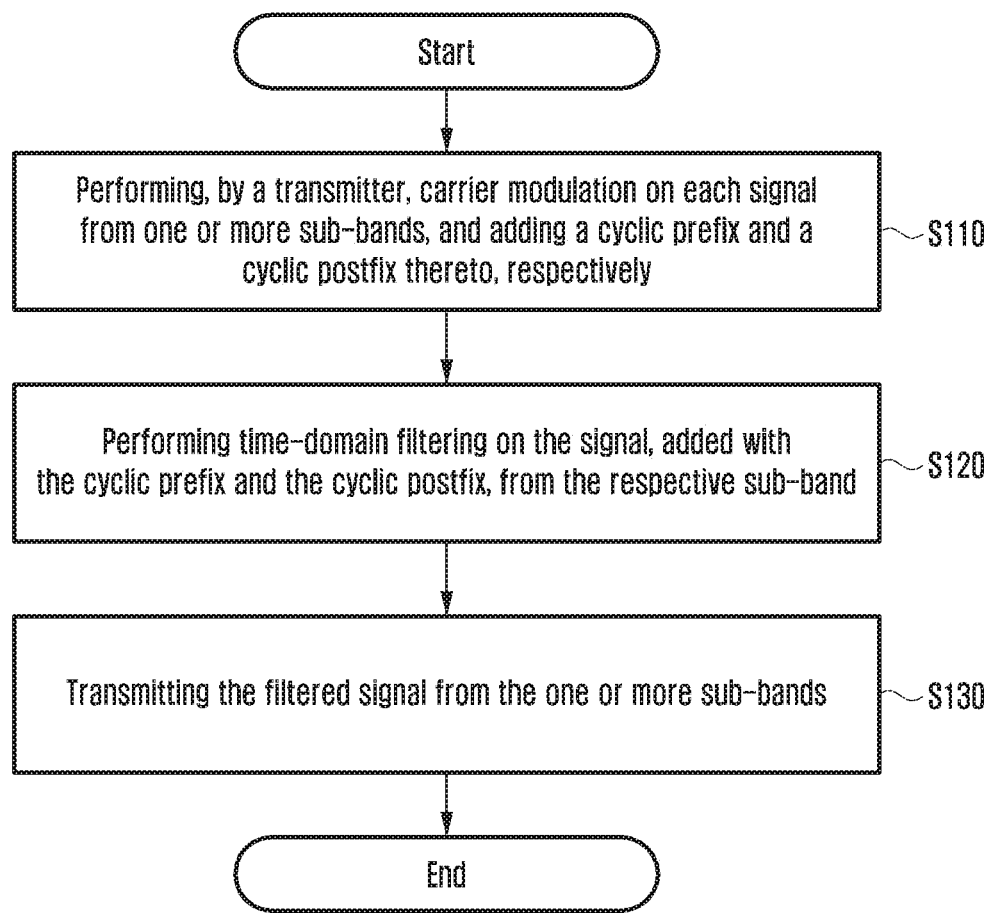
FIG. 4 is a schematic flowchart of a filtering-based signal transmission method according to one embodiment of the present disclosure.

FIG. 4 is a schematic flowchart of a filtering-based signal transmission method according to one embodiment of the present disclosure.

Referring to FIG. 4, in operation S110: A transmitter performs carrier modulation on each signal from one or more sub-bands, and adds a cyclic prefix and a cyclic postfix thereto, respectively.

Specifically, the transmitter performs carrier modulation on a signal from each sub-band according to a carrier modulation parameter corresponding to each sub-band, and adds a cyclic prefix and a cyclic postfix thereto, respectively.

The carrier modulation parameter comprises but is not limited to:

Sub-carrier spacing, length of a cyclic prefix, length of a cyclic postfix, and total length of a cyclic prefix and a cyclic postfix.

The carrier modulation method comprises but is not limited to OFDM and single-carrier frequency-division multiple access (SC-FDMA).

In an implementation, carrier modulation is performed on signals from any two of multiple sub-bands by using a same or different carrier modulation parameter, and a cyclic prefix and a cyclic postfix are added thereto, respectively.

Specifically, the method of adding a cyclic prefix and a cyclic postfix to a signal from each sub-band specifically comprises: according to a first pre-defined symbol number corresponding to length of a cyclic prefix of any sub-band, extracting the last first pre-defined symbol number of symbols in the carrier modulated signal corresponding to the sub-band, and adding, in an order of symbols, the extracted symbols before the carrier modulated signal as a cyclic prefix, and according to a second pre-defined symbol number corresponding to length of a cyclic postfix of any sub-band, extracting the previous second pre-defined symbol number of symbols in the carrier modulated signal corresponding to the sub-band, and adding, in an order of symbols, the extracted symbols after the carrier modulated signal as a cyclic postfix.

In an implementation, the transmitter performs channel coding and symbol modulation on each input signal from one or more sub-bands, and performs carrier modulation on the coded and modulated signal.

Specifically, the transmitter performs channel coding and symbol modulation on each input signal from one or more sub-bands in a modulation and coding scheme (MCS).

In an implementation, channel coding and symbol modulation are performed on signals from any two of multiple sub-bands with a same or different MCS.

The channel coding method comprises but is not limited to Turbo code coding.

The symbol modulation method comprises but is not limited to QAM and PSK.

In an implementation, determining, by the transmitter, length of a cyclic prefix and length of a cyclic postfix comprised in the carrier modulation parameter at least comprises:

1) The transmitter determines length of a cyclic prefix and length of a cyclic postfix according to sub-band bandwidth corresponding to each sub-band, downlink channel state information and symbol modulation.

Specifically, the transmitter receives downlink channel state information corresponding to each sub-band transmitted by a receiver. Alternatively, the transmitter performs uplink channel estimation according to a sounding reference signal of each sub-band transmitted by a receiver, in order to determine uplink channel state information corresponding to each sub-band, and subsequently, determines downlink channel state information corresponding to each sub-band according to the reciprocity of uplink and downlink channels and based on the uplink channel state information corresponding to each sub-band. The above specific implementation corresponds to the way of determining downlink channel state information in time division duplexing (TDD) and frequency division duplexing (FDD), in TDD mode, the downlink channel state information is determined according to the reciprocity of channels, and in FDD mode, the downlink channel state information is determined by the feedback of a receiver.

2) The transmitter receives indication information of a cyclic prefix and a cyclic postfix transmitted by a receiver, and determines length of a cyclic prefix and length of a cyclic postfix according to the indication information of the cyclic prefix and the cyclic postfix and total length of the cyclic prefix and the cyclic postfix.

In an implementation, the transmitter transmits indication information of a cyclic prefix and a cyclic postfix to a receiver, wherein the indication information of a cyclic prefix and a cyclic postfix comprises at least any one of: a ratio of length of a cyclic prefix to length of a cyclic postfix, a ratio of length of a cyclic prefix to total length of the cyclic prefix and a cyclic postfix, a ratio of length of a cyclic postfix to total length of a cyclic prefix and the cyclic postfix, length of a cyclic prefix, and length of a cyclic postfix, wherein the indication information of a cyclic prefix and a cyclic postfix can be used for determining length of the cyclic prefix and length of the cyclic postfix.

In an implementation, the transmitter adjusts length of a cyclic prefix and length of a cyclic postfix according to the power relationship between the carrier modulated symbols.

Specifically, adjusting length of a cyclic prefix and length of a cyclic postfix according to the power relationship between carrier modulated symbols at least comprises: when the power of a carrier modulated symbol is higher than a pre-defined power threshold of two carrier modulated symbols adjacent thereto, increasing the ratio of length of a cyclic prefix or cyclic postfix on a side, close to a high-power carrier modulated symbol, of the two adjacent carrier modulated symbols, in total length of a cyclic prefix and a cyclic postfix, and when a carrier modulated symbol is not used for transmission of data, increasing the ratio of length of a cyclic prefix or cyclic postfix on a side, away from the carrier modulated symbol, of the two adjacent carrier modulated symbols, in total length of a cyclic prefix and a cyclic postfix.

In operation S120: Time-domain filtering is performed on the signal, added with a cyclic prefix and a cyclic postfix, from each sub-band.

In operation S130: The filtered signal from one or more sub-bands is transmitted.

Specifically, when there is only one sub-band, the filtered signal from the sub-band is directly transmitted, and when there are multiple sub-bands, the filtered signal from each sub-band is superposed, and the superposed signal is transmitted.

Figure 5:
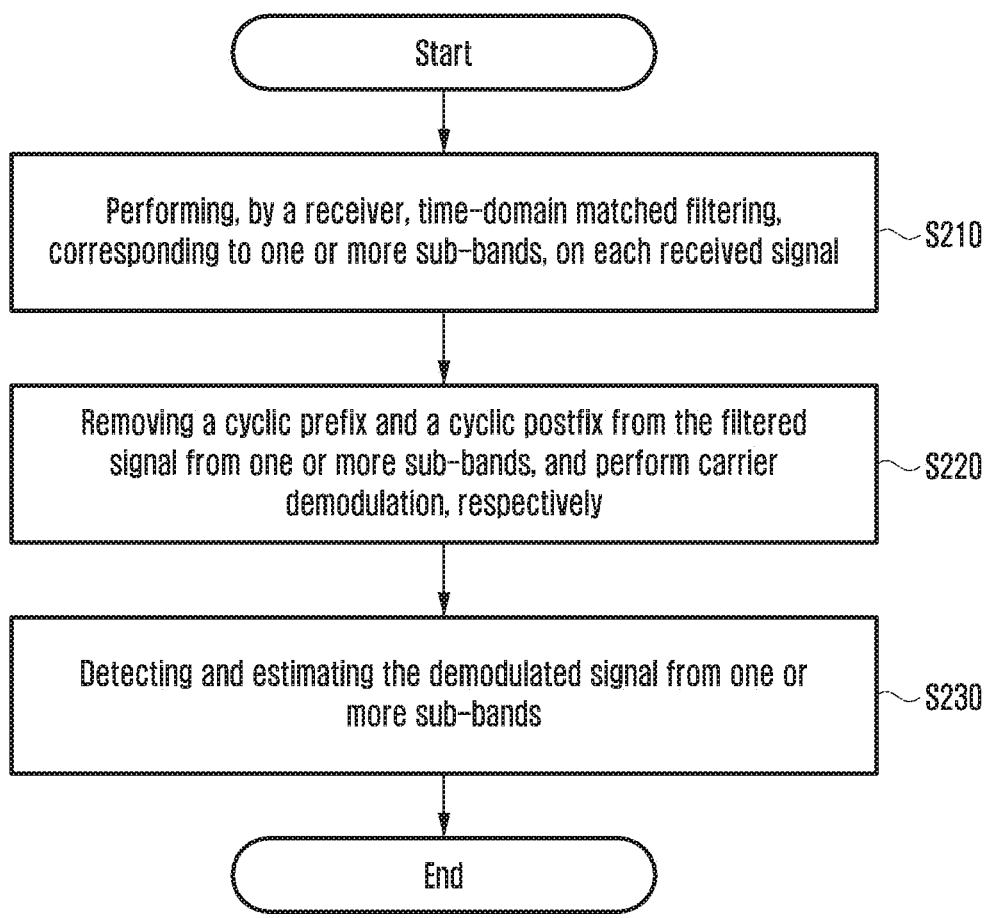
FIG. 5 is a schematic flowchart of a filtering-based signal receiving method according to an embodiment of the present disclosure.

FIG. 5 is a schematic flowchart of a filtering-based signal receiving method according to an embodiment of the present disclosure.

Referring to FIG. 5, in operation S210: A receiver performs time-domain matched filtering, corresponding to one or more sub-bands, on each received signal.

In operation S220: The receiver removes a cyclic prefix and a cyclic postfix from the filtered signal from one or more sub-bands, and performs carrier demodulation, respectively.

Specifically, the receiver removes a cyclic prefix and a cyclic postfix from the filtered signal from one or more sub-bands according to a carrier modulation parameter corresponding to one or more sub-bands, and performs carrier demodulation, respectively.

The carrier modulation parameter at least comprises: sub-carrier spacing, length of a cyclic prefix, length of a cyclic postfix, and total length of a cyclic prefix and a cyclic postfix.

The carrier demodulation method comprises at least any one of: OFDM and SC-FDMA.

In an implementation, removing a cyclic prefix and a cyclic postfix from the filtered signal from one or more sub-bands specifically comprises: according to length of a cyclic prefix and/or length of a cyclic postfix of one or more sub-bands, extracting, by means of windowing, a signal removed off the cyclic prefix and the cyclic postfix.

In an implementation, determining, by the receiver, length of a cyclic prefix and length of a cyclic postfix comprised in the carrier modulation parameter at last comprises:

1) The receiver determines length of a cyclic prefix and length of a cyclic postfix according to bandwidth of one or more sub-bands, downlink channel state information and symbol modulation.

Specifically, the receiver performs channel estimation, according to a downlink reference signal of one or more sub-bands transmitted by a transmitter, to determine downlink channel state information.

2) The receiver receives indication information of a cyclic prefix and a cyclic postfix transmitted by a transmitter.

The indication information of a cyclic prefix and a cyclic postfix comprises at least any one of: a ratio of length of a cyclic prefix to length of a cyclic postfix, a ratio of length of a cyclic prefix to total length of the cyclic prefix and a cyclic postfix, a ratio of length of a cyclic postfix to total length of a cyclic prefix and the cyclic postfix, length of a cyclic prefix, and length of a cyclic postfix.

The receiver determines length of a cyclic prefix and length of a cyclic postfix according to the indication information of the cyclic prefix and the cyclic postfix.

S230: The demodulated signal from one or more sub-bands is detected and estimated.

Specifically, the demodulated signal from one or more sub-bands is detected and estimated according to an MCS corresponding to one or more sub-bands.

Figure 6:
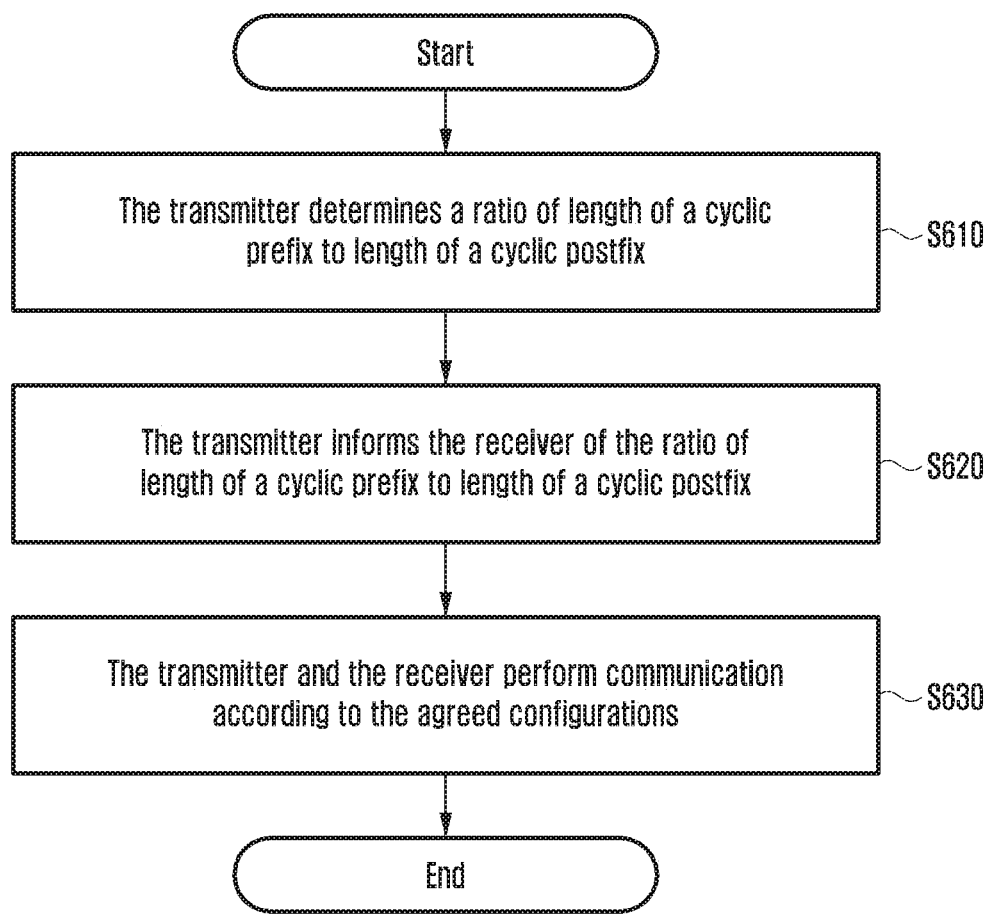
FIG. 6 is a flowchart of an F-OFDM signal transmission method according to an embodiment of the present disclosure.

FIG. 6 is a flowchart of an F-OFDM signal transmission method according to an embodiment of the present disclosure.

Referring to FIG. 6, by reducing length of a cyclic prefix and adding a cyclic postfix while keeping total length of a cyclic prefix and a cyclic postfix constant, ISI from a previous symbol and a next symbol can be considered at the same time, so that the degradation of the bit error rate (BER) performance due to ISI is relieved. First, in operation S610, the transmitter determines a ratio of length of a cyclic prefix to length of a cyclic postfix according to the service requirements of a receiver and the channel state condition. The channel state information is fed back by a receiver or estimated and determined by a base station according to a sounding reference signal transmitted by a receiver. After determining a ratio of length of a cyclic prefix to length of a cyclic postfix, in operation S620, the base station informs the receiver by a physical downlink control channel (PDCCH), physical downlink share channel (PDSCH), or physical broadcast channel (PBCH). Then, in operation S630, the transmitter and the receiver determine the F-OFDM symbol structure and frame structure according to the agreed configurations, and perform uplink and downlink data communication.

In a first specific embodiment of the present disclosure, a flexibly-configured F-OFDM system will be detailed in combination with specific system configurations. The available bandwidth of the system is BW. The available bandwidth is divided by a transmitter into L sub-bands based on the service requirements of receivers or the number of receivers to be served, the multi-carrier modulation parameter used in each sub-band is determined, comprising sub-carrier spacing, length of a cyclic prefix, length of a cyclic postfix, or more, and the L sub-bands are allocated to receivers based on the service requirements. The carrier modulation parameter of each sub-band depends upon a user to be served and the service, and a different sub-band can use a different carrier modulation parameter. Compared with the multi-carrier modulation system of a long-term evolution-advanced (LTE-A) system, the way of using a different carrier modulation parameter on a different sub-band can provide higher flexibility for the system, and also facilitate the scheduling of users and service.

Figure 7:
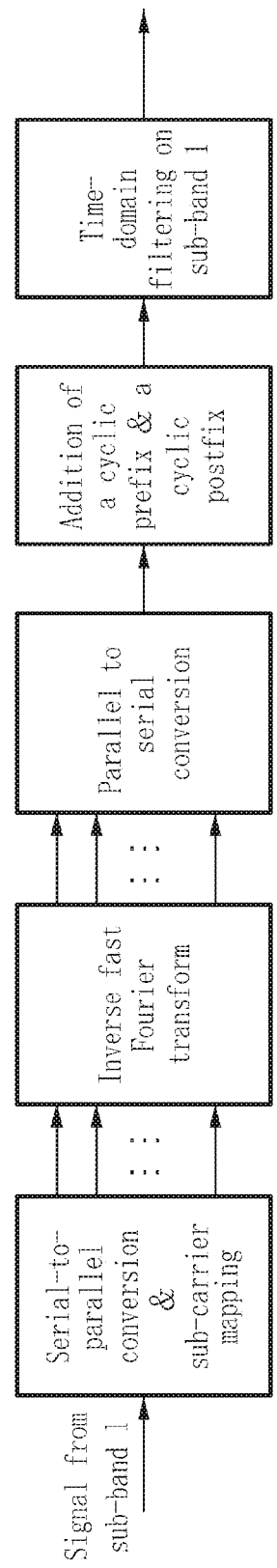
FIG. 7 is a block diagram of a transmitter of a sub-band 1 according to an embodiment of the present disclosure.

FIG. 7 is a block diagram of a transmitter of a sub-band l according to an embodiment of the present disclosure.

Figure 8:
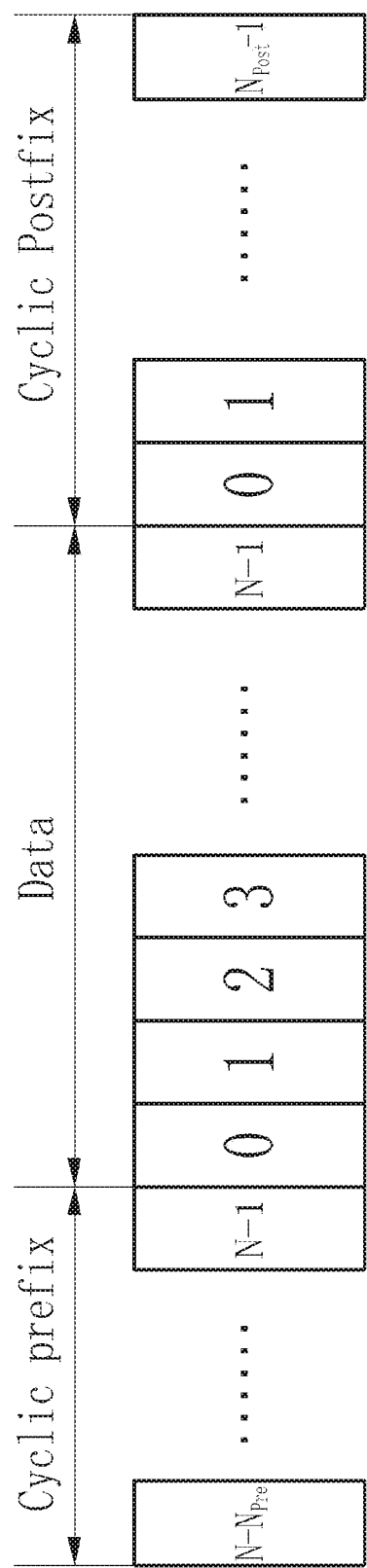
FIG. 8 is a schematic diagram of adding a cyclic prefix and a cyclic postfix according to an embodiment of the present disclosure.

Referring to FIG. 7, the input signal of the transmitter of the sub-band l is a complex signal having passed through channel coding and symbol modulation. The complex signal passes through serial-to-parallel conversion and sub-carrier mapping, and then to IFFT and parallel-to-serial conversion to obtain a time-domain signal, and the time-domain signal is added with a cyclic prefix and a cyclic postfix. It is assumed that length of a cyclic prefix is $N_{Pre}$, length of a cyclic postfix is $N_{Post}$, and $N_{Pre}+N_{Post}=CP$ is established. A cyclic prefix and a cyclic postfix are added in a way as shown in FIG. 8. For example, the last $N_{Pre}$ symbols having passed through IFFT are used as a cyclic prefix which is added before time-domain data symbols in an order of symbols, and the previous $N_{Post}$ symbols of the time-domain data symbols are used as a cyclic postfix which is added after the time-domain data symbols in an order of symbols.

FIG. 8 is a schematic diagram of adding a cyclic prefix and a cyclic postfix according to an embodiment of the present disclosure.

Referring to FIG. 8, the data symbols to be transmitted on sub-band l are expressed by $s_l=[s_l(0), \ldots, s_l(N_l-1)]^T$, where $N_l$ is the number of effective data symbol on the sub-band l. The signal, having passed through serial-to-parallel conversion, IFFT, parallel-to-serial conversion, and addition process of a cyclic prefix and a cyclic postfix, is expressed by:

$$x_l = \frac{1}{N} C_F F_N^H A_l s_l \qquad \text{Equation 2}$$

N is the IFFT size, the matrixes $A_l$ and $F_N$ have the same definition as that for Formula 1) as described above, and the matrix $C_F$ represents the addition of a prefix or postfix and is expressed by:

$$C_F = \begin{bmatrix} C_1 \\ I_N \\ C_2 \end{bmatrix}$$

the matrix C1 represents the addition of a cyclic prefix and is expressed by
$C_1=[O_{N_{Pre} \times (N-N_{Pre})} \ I_{N_{Pre}}]$, and the matrix C2 represents the addition of a cyclic postfix and is expressed by $C_2=[I_{N_{Post}} \ O_{N_{Post} \times (N-N_{Post})}]$.

If the impulse response of time-domain filter of the sub-band l is $f_l$, time-domain filtering is performed on a symbol sequence added with a cyclic prefix and a cyclic postfix to obtain $y_l=f_l*x_l$. Signals from L sub-bands are superposed to obtain a superposed signal to be transmitted, i.e., $y=\Sigma_l y_l$.

It is to be noted that the multi-carrier parameters used on different sub-bands, comprising sub-carrier spacing, total length of a cyclic prefix and a cyclic postfix, and a ratio of length of a cyclic prefix to length of a cyclic postfix, can be the same or different. The time-domain filter of the sub-band adjusts the impulse response according to the location of the center frequency point of the sub-band. In order to reduce the interference between sub-bands, a small number of sub-carriers at the edge of the sub-band is reserved and used as guard band.

Figure 9:
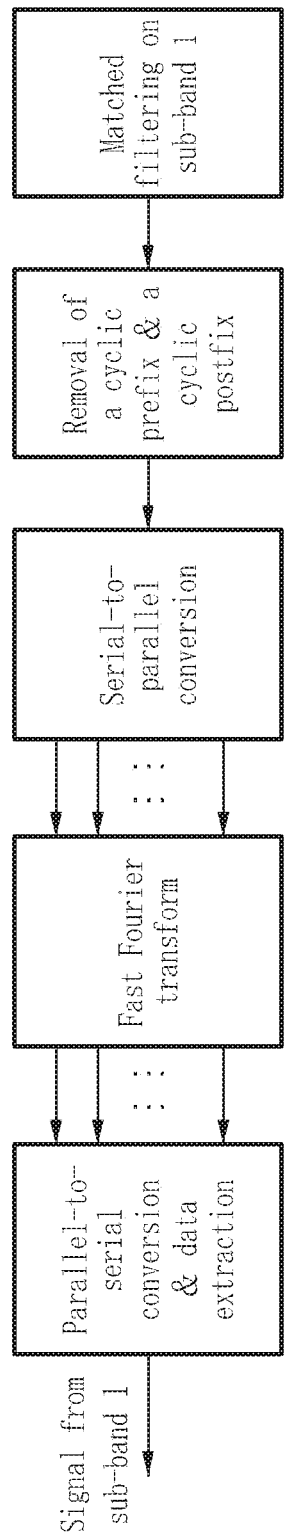
FIG. 9 is a block diagram of a receiver of a sub-band 1 according to an embodiment of the present disclosure.

FIG. 9 is a block diagram of a receiver of a sub-band l according to an embodiment of the present disclosure.

Figure 10:
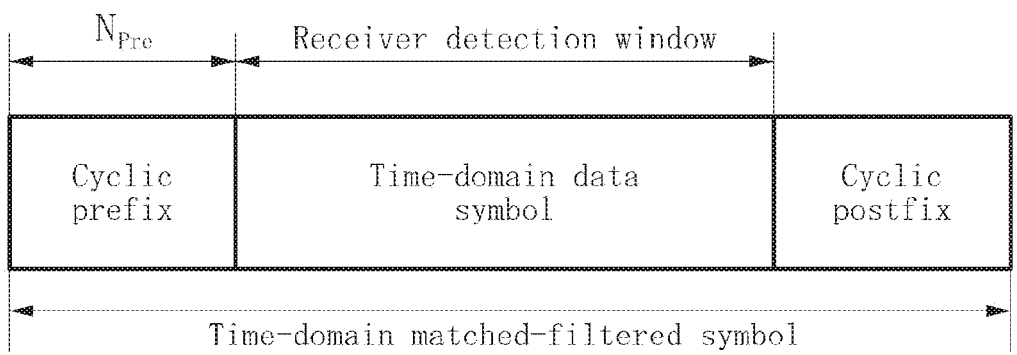
FIG. 10 is a schematic diagram of location of a time-domain detection window of a receiver according to an embodiment of the present disclosure.

Referring to FIG. 9, in order to obtain an estimated value of a signal transmitted on the sub-band l, first, the receiver performs matched filtering of the sub-band l on each received signal to filter out interference from other sub-bands, and then removes a cyclic prefix and a cyclic postfix. Similarly to a system in which only a cyclic prefix is added, the removal of a cyclic prefix and a cyclic postfix can be completed by means of windowing. The difference lies in the location of the receiver detection window. It is assumed that length of a cyclic prefix is $N_{Pre}$, length of a cyclic postfix is $N_{Post}$, and the location of the detection window of the receiver is as shown in FIG. 10. For example, N symbol samples are truncated, beginning from $N_{Pre}$ symbol samples from the starting point of the time-domain matched-filtered symbols.

FIG. 10 is a schematic diagram of location of a time-domain detection window of a receiver according to an embodiment of the present disclosure.

Referring to FIG. 10, after the removal of a cyclic prefix and a cyclic postfix, and by serial-to-parallel conversion, N-point FFT, and parallel-to-serial conversion, the receiver determines the estimation of transmitted symbols, and performs the subsequent symbol demodulation, decoding and other operations.

In order to estimate an equivalent channel having passed through the time-domain filtering on the transmitter side, channel and the matched filtering on the receiver side, it is necessary to insert a reference signal before the OFDM modulation to perform a same operation as the data transmission. The receiver estimates an equivalent channel according to the reference signal, and obtains an equivalent channel coefficient of each sub-carrier by operations, such as interpolation, which is to be used in operations, such as symbol demodulation.

A received signal having passed through channel and noise is expressed by r, i.e., r=h*y+n, where h is the channel impulse response and n is the additive white Gaussian noise. For a sub-band l, its impulse response of matched filter is expressed by $\bar{f}_l$. When the data transmitted on the sub-band l is demodulated and estimated, time-domain matched filtering is performed on the data to obtain:

$$r_l^r = \bar{f}_l^* r.$$

The time-domain symbols without considering the head and tail caused by the time-domain filtering are expressed by $y_l^r$, which is a $N+N_{CP}$ dimensional vector. In this case, the processing on the receiver side can be expressed by:

$$\bar{s}_l = A_l^r F_N C_F^r y_l^r$$

Where the matrix $C_F^r$ is a $N \times (N+N_{CP})$ dimensional matrix, which is used for removing a cyclic prefix and a cyclic postfix and specifically expressed by $C_F^r = [O_{N \times N_{Pre}}, I_N, O_{N \times N_{Post}}]$, equivalently describing location of the detection window on the receiving side. The matrix $F_N$ is an N-point fast Fourier transform matrix, which represents of fast Fourier transform on a symbol removed off a cyclic prefix and a cyclic postfix. The matrix $A_l^r$ is a $N_l \times N$ dimensional matrix, which is used for acquiring data on the $l^{th}$ sub-band, and expressed by $A_l^r = [O_{N_l \times N_1}, I_{N_l}, O_{N_l \times (N-N_l-N_1)}]$. The obtained vector $\bar{s}_l$ is a $N_l$ dimensional vector which is a carrier-demodulated data of data transmitted on the sub-band l. The actual time-domain impulse response of equivalent channel is $\bar{f}_l^* * h * f_l$, and it is required to estimate the frequency-domain response of such an equivalent channel by inserting a reference signal or in other ways, to be used in the subsequent demodulation and decoding and other operations.

Compared with a F-OFDM system of the related art, although the ISI caused by the extension of time-domain symbols still exists, by selecting an appropriate ratio of length of a cyclic prefix to length of a cyclic postfix, most of the ISI from adjacent symbols can be eliminated while removing the cyclic prefix and the cyclic postfix on the receiver side. In this way, the BER performance of the system is improved, and the link stability and link reliability are improved.

It is to be noted that, the description of the above embodiments is based on the OFDM carrier modulation with time-domain filtering. Other types of carrier modulation, for example, SC-FDMA, can be combined with time-domain filtering. In this case, time-domain filtering can also result in the head and tail of symbols to cause the ISI problem. Hence, the solution of simultaneously adding a cyclic prefix and a cyclic postfix as provided by the present disclosure still can be used to reduce the ISI and improve the reliability and stability of links.

As can be seen, a ratio of length of a cyclic prefix to length of a cyclic postfix determines the properties of the solution as provided by the present disclosure. A transmitter determines length of a cyclic prefix and length of a cyclic postfix to be added, according to bandwidth of each sub-band, downlink channel state information of each sub-band, and the used symbol modulation, and inform a receiver of length of a cyclic prefix and length of a cyclic postfix by a PDCCH, PDSCH or PBCH. The transmitter obtains the downlink channel state information according to downlink channel estimation feedback estimated by the receiver on each sub-band by a cell-specific reference signal (CRS) or a channel state information reference signal (CSI-RS). Alternatively, estimates directly, in a TDD mode, uplink channel state information by a sounding reference signal (SRS) transmitted by the receiver, and deduces the downlink channel state information according to the channel reciprocity of uplink and downlink channels. The transmitter determines a ratio of length of a cyclic prefix to length of a cyclic postfix to be used, by comprehensively considering bandwidth of a sub-band, downlink channel state information of a sub-band, and a modulation and code scheme. Specifically, a ratio of length of a cyclic prefix to length of a cyclic postfix to be used by each sub-band is determined according to bandwidth of a sub-band, downlink channel state information, and symbol modulation. The smaller the bandwidth of a sub-band is, the longer the length of a used cyclic postfix is, that is, a narrow sub-band should use a longer cyclic postfix, the higher the used modulation order is, the longer the length of a cyclic postfix is, and the higher the channel selective fading is, the shorter the length of a used cyclic postfix is. The degree of channel selective fading is characterized by a corresponding index. For example, the degree of frequency selective fading can be measured by coherent bandwidth, or delay spread, or other indexes, and smaller coherent bandwidth or larger delay spread indicates higher frequency selectivity of a channel, and the degree of time selective fading can be measured by coherent time, Doppler frequency shift, relative moving speed or other indexes, and, less coherent time, strong Doppler frequency shift and larger relative moving speed indicate higher time channel selective fading. By comprehensively considering those factors, a ratio of length of a cyclic prefix to length of a cyclic postfix in different scenarios can be obtained, so that length of a cyclic prefix and length of a cyclic postfix are further obtained. For example, a corresponding lookup table is made to determine a ratio of length of a cyclic prefix to length of a cyclic postfix in different scenarios. Table 1 shows a lookup table in one specific application scenario.

TABLE 1

Lookup table of length of a cyclic prefix and length of a cyclic postfix

| Bandwidth of a sub-band (RB) | Degree of selective fading | Modulation order | Ratio of length of a cyclic postfix to total length |
|---|---|---|---|
| 6-40 | — | — | 0.5 |
| 41-60 | High | Higher than or equal to 16 | 0.5 |
| 41-60 | High | Lower than 16 | 0.25 |
| 41-60 | low | Higher than or equal to 16 | 0.25 |
| 41-60 | low | Lower than 16 | 0.15 |
| 61-110 | — | — | 0.1 |

In Table 1, symbol "--" means "irrelevant". For example, when data in the first row of Table 1 represents that the bandwidth to be allocated to a sub-band is 6-40 PRBs, a configuration where length of a cyclic prefix is equal to length of a cyclic postfix should be used, regardless of the channel selective fading and the modulation order. This is because, when the bandwidth of a sub-band is narrow, it is unable to design a time-domain filter with concentrated energy. Hence, a cyclic prefix and a cyclic postfix with a same length are required to eliminate the ISI caused by the extension of symbols. In more extreme conditions, for example, when the degree of time selective fading is very serious, such as in a high-speed travelling train, it even needs to increase overall length of a cyclic prefix and length of a cyclic postfix to deal with the ISI. In a case where the bandwidth of a sub-band is moderate, both the degree of channel selective fading and the used symbol modulation order can be taken into consideration at the same time. If the degree of channel selective fading is high and a high modulation order is needed, the influence of the ISI on the system is significant, and in this case, a cyclic prefix and a cyclic postfix with a same length are still needed. If the degree of channel selective fading is high while a low modulation order is used, or when a high modulation order is used while the degree of channel selective fading is low, the influence of the ISI is low, and in this case, a long cyclic prefix and a short cyclic postfix can be used. If a low modulation order is used and the degree of channel selective fading is also low, a longer cyclic prefix can be used. And, if the bandwidth of a sub-band is wide, a time-domain filter with concentrated energy can be designed and the ISI is less, and in this case, a short or even no cyclic postfix can be used without causing significant influence on the performance of the system.

It is to be noted that Table 1 just shows one possible example. How to determine length of a cyclic prefix and length of a cyclic postfix should be decided by tests and validations for a practical system.

The transmitter informs the receiver of length of a cyclic prefix and length of a cyclic postfix by a PDCCH, PDSCH or PBCH. The receiver is informed by indication information of a cyclic prefix and a cyclic postfix. The indication information of a cyclic prefix and a cyclic postfix can include a ratio of length of a cyclic prefix to length of a cyclic postfix, a ratio of length of a cyclic prefix to total length of the cyclic prefix and a cyclic postfix, a ratio of length of a cyclic postfix to total length of a cyclic prefix and the cyclic postfix, length of a cyclic prefix, and length of a cyclic postfix. The receiver can be specifically informed in a lookup table way. For example, the receiver is informed only by the indication information of a cyclic prefix and a cyclic postfix, so that the receiver obtains length of the cyclic prefix and length of the cyclic postfix, corresponding to indexes, by the lookup table.

After determining length of a cyclic prefix and length of a cyclic postfix, the transmitter and the receiver perform communication according to the agreed configurations. For example, when transmitting a signal, the transmitter inserts a cyclic prefix of a corresponding length and a cyclic postfix of a corresponding length, and upon receiving the signal, the receiver adjusts the location of the receiving detection window accordingly.

In a second specific embodiment of the present disclosure, a flexibly-configured F-OFDM system will be detailed by specific system configurations and parameter settings. The bandwidth of the system is divided into one sub-band, the bandwidth of which is 540 KHz, i.e., equivalently a narrow-band system. The sub-carrier spacing is 15 KHz, that is, the sub-band contains 36 sub-carriers. The number of FFT points is 1024, that is, the number of time-domain samples is 1024 before a cyclic prefix and a cyclic postfix are added. Each data block contains 7 symbols. The used modulation method is 16QAM and 64QAM. The channel model is an EVA channel with a relative moving speed of 120 km/h and a carrier frequency of 2 GHz.

In an F-OFDM system, the impulse response of time-domain filter is as shown in FIG. 3A, and length of the filter is 512. Total length of the cyclic prefix and cyclic postfix is 72 time-domain samples. The following two configurations are considered: 72 samples are all used as a cyclic prefix, and 36 samples are used as a cyclic prefix and 36 samples are used as a cyclic postfix. In the two configurations, total length of the used cyclic prefix and cyclic postfix is the same. Meanwhile, when compared with the CP-OFDM of the related art, CP length is 72 time-domain samples. In those three scenarios, total length of the cyclic prefix and cyclic postfix is the same. Hence, the performance against the frequency channel selective fading is the same. The BER performance and spectrum OOB emission of systems in different configurations are compared by simulation.

Figure 11:
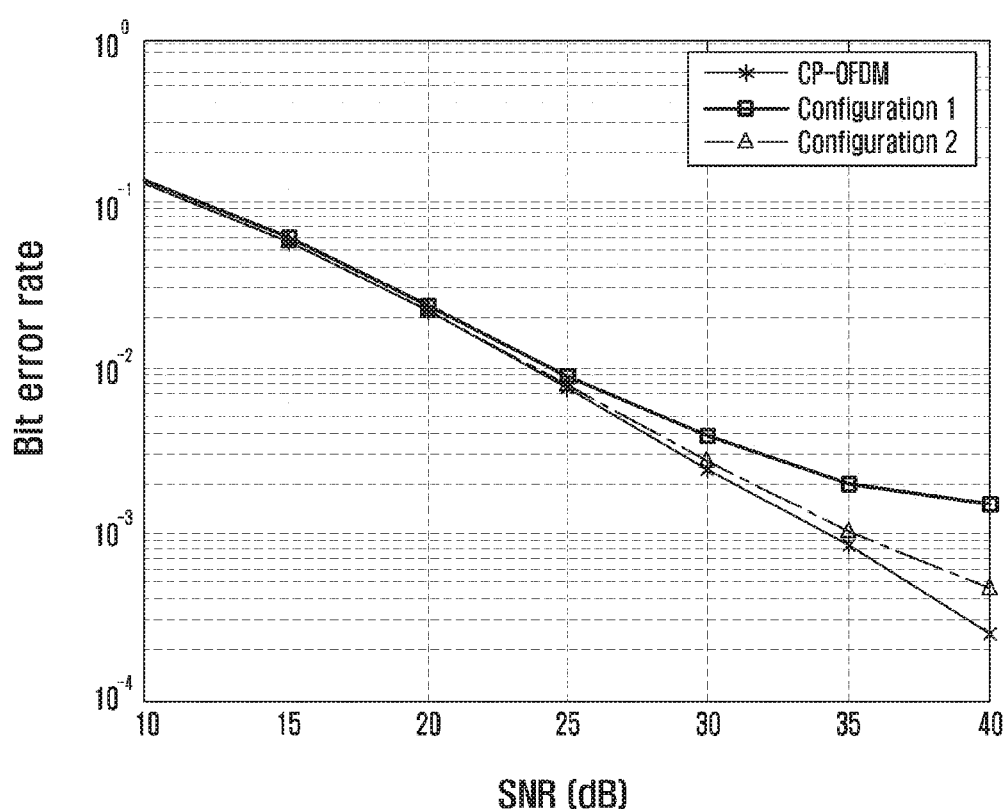
FIG. 11 is a schematic bit error rate (BER) performance comparison diagram in different configurations when 16 quadrature amplitude modulation (QAM) modulation method is employed, according to a second specific embodiment of the present disclosure.

FIG. 11 is a schematic BER performance comparison diagram in different configurations when 16QAM modulation method is employed, according to a second specific embodiment of the present disclosure.

Figure 12:
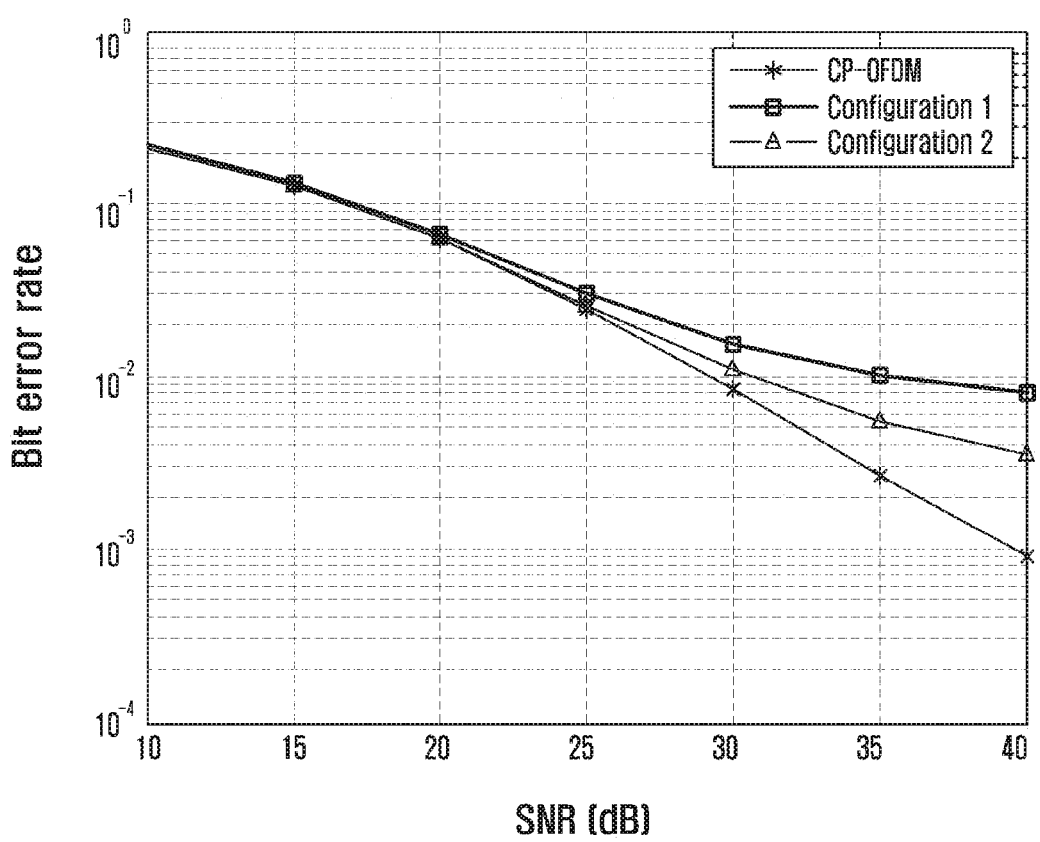
FIG. 12 is a schematic comparison diagram of BER performance in different configurations when 64QAM modulation method is employed, according to the second specific embodiment of the present disclosure.

FIG. 12 is a schematic comparison diagram of BER performance in different configurations when 64QAM modulation method is employed, according to the second specific embodiment of the present disclosure.

Referring to FIGS. 11 and 12, schematic BER performance comparison diagrams of the system in different configurations are illustrated when 16QAM modulation and 64QAM modulation are employed, respectively. It can be known from FIG. 3A that, if the impulse response of the used sub-band time-domain filter is long, the head and tail of symbols caused by the time-domain filtering will be long. Although energy of impulse response can be concentrated by the design of the filter, for a narrow-band system, energy of time-domain impulse response cannot be concentrated in a limited region, so that the ISI caused by time-domain filtering also cannot be ignored. When the channel condition is poor, for example, in high-speed moving or in a channel with a long channel delay, loss of BER performance or even error floor will occur in a high signal-to-noise ratio (SNR), thereby influencing the link reliability. For example, as shown in FIG. 11, when 16QAM modulation is employed, in the F-OFDM with a cyclic prefix only, loss of BER performance will occur after 20 dB, when compared with the CP-OFDM system. And, this loss of BER performance will be more obvious in a system employing a higher modulation order. As shown in FIG. 12, when 64QAM modulation is employed, loss of BER performance will occur more early, and in a high SNR, the descending slope of BER curve along with the increase in the SNR is significantly reduced.

The above problem is caused by the use of a cyclic prefix only. Although a cyclic prefix can reduce or even eliminate the influence of the tail of a previous symbol caused by time-domain filtering on a symbol, it cannot eliminate the influence of the head of a next symbol. In this case, the ISI occurs. By reducing length of a cyclic prefix and adding a cyclic postfix, the tail of a previous symbol and the head of a next symbol can be both considered, and in this case, the influence of the ISI on the reliability of links is reduced. In FIG. 11, when 16QAM is employed, after adding a cyclic postfix, the influence of time-domain filtering is significantly reduced. When BER is about $10^{-3}$, there is difference of only about 0.5 dB between the F-OFDM with a cyclic postfix added and OFDM. While in comparison with a configuration using F-OFDM only, the gain exceeds 5 dB. For a system employing 64QAM as shown in FIG. 12, the addition of a cyclic postfix can also significantly reduce the ISI caused by the head and tail of the filter and can significantly improve the reliability of links of the system.

In another aspect, since time-domain filtering is performed after the addition of a cyclic prefix and a cyclic postfix, the addition of a cyclic postfix will have no influence on the spectral performance of the system. Excellent OOB emission performance still can be obtained by the optimization of the time-domain filter.

For a channel with a large delay and high frequency selective fading, if the bandwidth of sub-bands is small, a case where total length of a cyclic prefix and a cyclic postfix is less than the sum of the channel delay and the filter delay may occur. In this case, it is unable to ensure the orthogonality between sub-carriers, so that the performance of the system is degraded. In this case, overall length of a cyclic prefix and length of a cyclic postfix can be increased appropriately to ensure the orthogonality between sub-carriers.

In a third specific embodiment of the present disclosure, a solution where the transmitter self-adaptively adjusts length of a cyclic prefix and length of a cyclic postfix according to the channel measurement result when the channel state changes will be detailed. The configuration of the transmitter is as described in the first specific embodiment of the present disclosure, F-OFDM is employed as the multi-carrier modulation method, and the used time-domain filter is obtained by the soft truncation of a sinc function with a window function. The entire bandwidth is divided into multiple sub-bands according to service requirements or other factors, and the sub-bands are allocated to receivers. In order to reduce the ISI caused by head and tail due to time-domain filtering, each F-OFDM symbol will be added with a cyclic prefix and a cyclic postfix.

First, the transmitter determines an initial ratio of length of a cyclic prefix to length of a cyclic postfix according to the bandwidth allocated to a sub-band, and informs the receiver of length of a cyclic prefix and length of a cyclic postfix by a PDCCH, PDSCH or PBCH. The receiver determines an F-OFDM symbol structure according to the bandwidth allocated to the sub-band and the ratio of length of a cyclic prefix to length of a cyclic postfix, estimates downlink channel state information according to a downlink reference signal, and feeds the downlink channel state information back to the transmitter. Alternatively, transmits a sounding reference signal by an uplink channel, so that the transmitter performs channel estimation of an uplink channel and determines downlink channel state information according to the reciprocity of uplink and downlink channels.

After acquiring the downlink channel state information, the transmitter determines the MCS used by the receiver, and obtains the degree of channel frequency selective fading and time selective fading from the downlink channel state information. The transmitter determines length of a cyclic prefix and length of a cyclic postfix according to the bandwidth of a sub-band, the symbol modulation selected according to the channel condition, and the degree of channel frequency selective fading and time selective fading, and informs the receiver of length of a cyclic prefix and length of a cyclic postfix by a PDCCH, PDSCH or PBCH. Specifically, the degree of channel frequency selective fading can be represented by estimation of coherent bandwidth or delay spread, and the degree of channel time selective fading can be represented by estimation of coherent time, Doppler frequency shift or moving speed of the receiver. The smaller the bandwidth of a sub-band is, the higher the channel selective fading is, the higher the used modulation order is, the more serious the ISI caused by time-domain filtering is, and a configuration where length of a cyclic prefix is closer to length of a cyclic postfix should be used. The specific way can employ the solution as described in the first specific embodiment of the present disclosure, that is, a lookup table of length of a cyclic prefix and length of a cyclic postfix, defined by the bandwidth of a sub-band, the degree of channel selective fading and the modulation order, is made. The example of the lookup table is as shown in Table 1. The specific length of a corresponding cyclic prefix and cyclic postfix is obtained from the lookup table, according to the actual scenarios.

After determining length of a cyclic prefix and length of a cyclic postfix, the transmitter informs the receiver by a PDCCH, PDSCH or PBCH to do corresponding adjustments. Specifically, the receiver can be informed by indication information of a cyclic prefix and a cyclic postfix. The indication information comprises but is not limited to a ratio of length of a cyclic prefix to length of a cyclic postfix, a ratio of length of a cyclic prefix to total length of the cyclic prefix and a cyclic postfix, a ratio of length of a cyclic postfix to total length of a cyclic prefix and the cyclic postfix, total length of a cyclic prefix and a cyclic postfix, length of a cyclic prefix, and length of a cyclic postfix. The informing can be done by adding a new filed in a downlink control format, the new field being used for transmitting the indication information of a cyclic prefix and a cyclic postfix in the PDCCH, or by adding a new field in PBCH, the new field being used for transmitting the indication information of a cyclic prefix and a cyclic postfix in the PDCCH, or transmitting the indication information to the corresponding receiver directly in the PDSCH.

Another way of dynamically adjusting length of a cyclic prefix and length of a cyclic postfix is as follows: the receiver selects an appropriate length of a cyclic prefix and an appropriate length of a cyclic postfix according to the bandwidth of a sub-band, the channel estimation of a downlink channel and the used symbol modulation, and feeds back to the transmitter by a physical uplink control channel or physical uplink shared channel. Upon receiving the feedback from the receiver, the transmitter determines whether to adjust length of a cyclic prefix and length of a cyclic postfix according to the channel quality information feedback, and informs the receiver by a physical downlink control channel or physical downlink shared channel. The way for the receiver to select length of a cyclic prefix and length of a cyclic postfix is similar to that on the transmitter side, that is, it determines length of a cyclic prefix and length of a cyclic postfix by combining the bandwidth of a sub-band, the degree of channel selective fading and the used modulation order. Specifically, the smaller the bandwidth of a sub-band is, the higher the channel selective fading is, the higher the used modulation order is, the more serious the ISI caused by time-domain filtering is, and a configuration where length of a cyclic prefix is closer to length of a cyclic postfix should be used. The receiver can determine length of a cyclic prefix and length of a cyclic postfix in a same way as described in the first specific embodiment of the present disclosure, that is, the specific configuration way can be read from a lookup table according to the actual scenarios.

After determining length of a cyclic prefix and length of a cyclic postfix, the receiver informs the transmitter by a physical uplink control channel or physical uplink shared channel. What is informed is the indication information of a cyclic prefix and a cyclic postfix. The indication information comprises a ratio of length of a cyclic prefix to length of a cyclic postfix, a ratio of length of a cyclic prefix to total length of the cyclic prefix and a cyclic postfix, a ratio of length of a cyclic postfix to total length of a cyclic prefix and the cyclic postfix, total length of a cyclic prefix and a cyclic postfix, length of a cyclic prefix, and length of a cyclic postfix. The informing can be done by adding a new field in a physical uplink control channel, the new field being used for transmitting the indication information of a cyclic prefix and a cyclic postfix, or adding the indication information in the physical uplink shared channel.

After acquiring length of a cyclic prefix and length of a cyclic postfix used by a sub-band from a PDCCH, PDSCH or PBCH, the receiver adjusts the configuration, performs data communication according to the new configuration, and feeds back the channel state information or the desired length of a cyclic prefix and length of a cyclic postfix in real time.

In a fourth specific embodiment of the present disclosure, the configuration of the transmitter is as described in the first specific embodiment of the present disclosure, F-OFDM is employed as the multi-carrier modulation method, and the used time-domain filter is obtained by the soft truncation of a sinc function with a window function. The entire bandwidth is divided into multiple sub-bands according to service requirements or other factors, and the sub-bands are allocated to receivers. The transmitter performs resource scheduling and service serving in unit of physical resource blocks (PRBs), and each PRB consists of 12 sub-carriers on 7 F-OFDM symbols. In terms of time-domain, one possible frame structure is as follows: each time slot consists of 7 F-OFDM symbols, each sub-frame consists of two time slots, and each radio frame consists of 10 sub-frames, as shown in FIG. 13.

Figure 13:
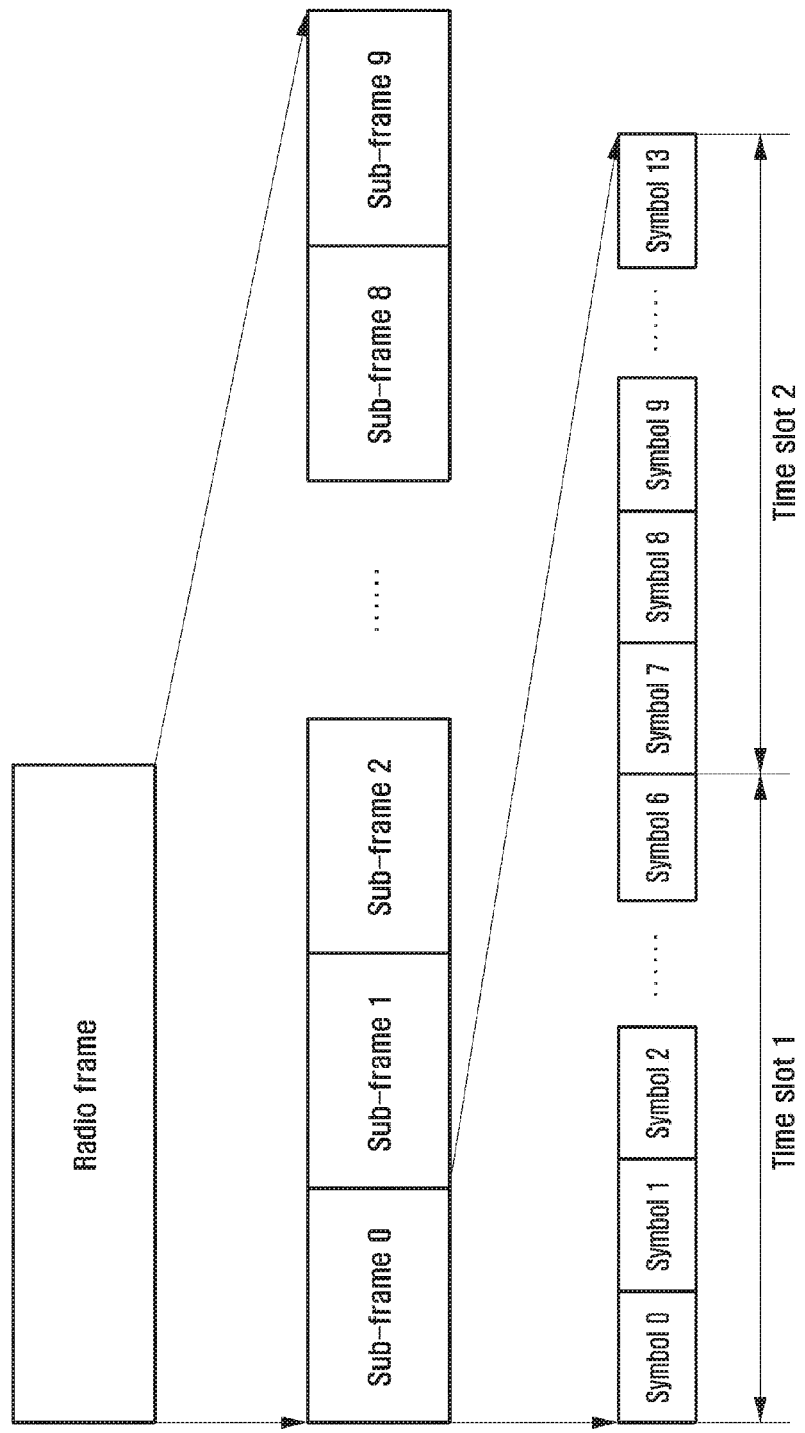
FIG. 13 is a schematic structure diagram of one possible radio frame according to a fourth specific embodiment of the present disclosure.

FIG. 13 is a schematic structure diagram of one possible radio frame according to a fourth specific embodiment of the present disclosure.

Referring to FIG. 13, it is to be noted that, according to different sub-carrier spacing of different sub-bands, the radio frame structure as shown in FIG. 13 can change. Specifically, the number of F-OFDM symbols in each time slot can be different. In order to reduce the ISI caused by head and tail due to time-domain filtering, each F-OFDM symbol is to be added with a cyclic prefix and a cyclic postfix.

Since different F-OFDM symbols in a same sub-frame can have different functions, different F-OFDM symbols can have different power or different F-OFDM symbols can suffer from different level of the ISI. In those cases, it is needed to adjust a ratio of length of a cyclic prefix to length of a cyclic postfix on different F-OFDM symbols, to reduce the ISI and improve the performance of the system.

In uplink transmission, it is needed to insert a SRS in an uplink sub-frame. In the configuration of the transmitter, the SRS transmission bandwidth will be greater than the transmission bandwidth allocated to the receiver. For example, the bandwidth allocated to the receiver is 6 PRBs, i.e., 72 sub-carriers in total, while the SRS transmission bandwidth allocated to the same receiver is 36 PRBs, i.e., 540 sub-carriers. As a result, when the receiver transmits a signal, the power of F-OFDM symbols transmitting the SRS will be significantly higher than that of symbols transmitting data. In this case, since the ISI caused by head and tail of symbols due to time-domain filtering will be more serious, SRS symbols with a high power will bring about significant interference to the adjacent data symbols.

To deal with such ISI caused by different power of adjacent symbols, low-power symbols adjacent to high-power symbols can be allowed to use a different ratio of length of a cyclic prefix to length of a cyclic postfix. One possible configuration is as shown in FIG. 14.

Figure 14:
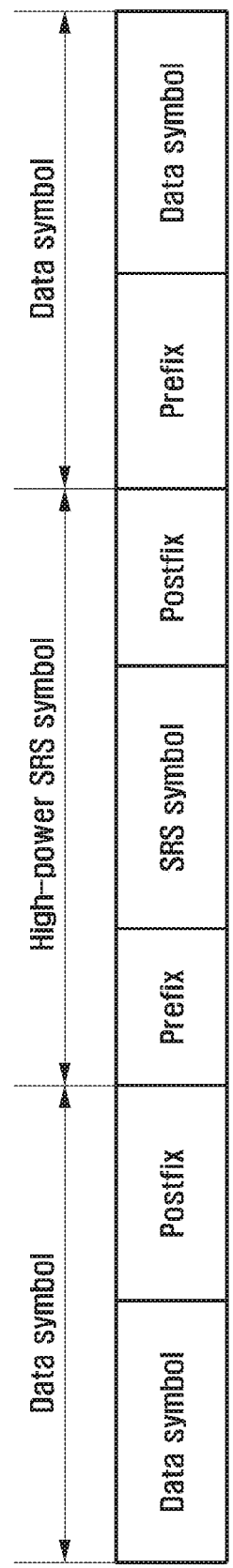
FIG. 14 is a schematic diagram of one possible data symbol structure according to an embodiment of the present disclosure.

FIG. 14 is a schematic configuration diagram of one possible ratio of length of a cyclic prefix to length of a cyclic postfix, which is used to deal with ISI caused by different power of symbols according to an embodiment of the present disclosure.

Referring to FIG. 14, high-power SRS symbols can use a cyclic prefix and a cyclic postfix with a same length, and can use other ratios of length of a cyclic prefix to length of a cyclic postfix. In order to reduce the interference from high-power SRS symbols to adjacent data symbols, a previous data symbol uses a long cyclic postfix and a next data symbol uses a long cyclic prefix. In this way, the interference from a high-power SRS symbol to the previous data symbol and the next data symbol is reduced. The example as shown in FIG. 14 is one possible configuration. As shown, the previous data symbol is added with a cyclic postfix only, and the next data symbol is added with a cyclic prefix only. The previous symbol and the next symbol can use a different ratio of length of a cyclic prefix to length of a cyclic postfix, according to the bandwidth allocated to a sub-band, the actual channel state information or the used symbol modulation method. For example, when the bandwidth of the used sub-band is narrow, length of a cyclic postfix used for the previous data symbol should have a large ratio of the total length, and length of a cyclic postfix used for the next data symbol should have a large ratio of the total length. When the bandwidth of the used sub-band is large, the ratio of length of a cyclic postfix used for the previous data symbol should also be increased, and a certain length of cyclic prefix is retained to eliminate the ISI from the previous data symbol, and the ratio of length of a cyclic prefix used for the next data symbol should also be increased, and a certain length of cyclic postfix is retained to eliminate the ISI from the next data symbol.

The transmitter selects length of a cyclic prefix and length of a cyclic postfix configured for data symbols before and after an F-OFDM symbol transmitting SRSs according to the allocation of sub-bands and the bandwidth of SRSs, and informs the receiver by a PDCCH, PDSCH or PBCH. When the transmitter requires transmission of Aperiodic SRSs (A-SRSs), it determines a ratio of length of a cyclic prefix to length of a cyclic postfix for the previous data symbol and the next data symbol according to the bandwidth of sub-bands and the bandwidth of A-SRSs, and transmits the ratio of length of a cyclic prefix to length of a cyclic postfix to the receiver together with an A-SRS transmitting request by a PDCCH, PDSCH or PBCH. The receiver adjusts the structure of symbols before and after the F-OFDM symbol transmitting A-SRSs according to the ratio of length of a cyclic prefix to length of a cyclic postfix, and transmits data and A-SRSs. The transmitter adjusts the location of the corresponding detection window, performs detection of data and reception of A-SRSs, and performs channel estimation.

Another case where it is necessary to use a different ratio of length of a cyclic prefix to length of a cyclic postfix in one time slot or sub-frame occurs in a system employing a TDD mode. In the TDD mode, the uplink data transmission and the downlink data transmission are carried out alternately in a time division way. In a frame structure in the TDD mode, it is necessary to insert a guard interval between a downlink data transmission symbol and an uplink data transmission symbol to provide handover protection between the downlink data transmission and the uplink data transmission. A downlink data symbol before the guard interval will not suffer from the ISI from the next symbol. Meanwhile, an uplink data symbol after the guard interval will not suffer from the ISI from the previous symbol.

For a downlink data symbol before the guard interval, the ratio of length of a cyclic prefix to length of a cyclic postfix can be adjusted, to increase the ratio of length of a cyclic prefix in the total length of the cyclic prefix and a cyclic postfix, so as to reduce the interference from the previous data symbol to this data symbol, and for an uplink data symbol after the guard interval, the ratio of length of a cyclic prefix to length of a cyclic postfix can be adjusted, to increase the ratio of length of a cyclic postfix in the total length of a cyclic prefix and the cyclic postfix, so as to reduce the interference from the next data symbol to this data symbol. The specific structure is as shown in FIG. 15.

Figure 15:
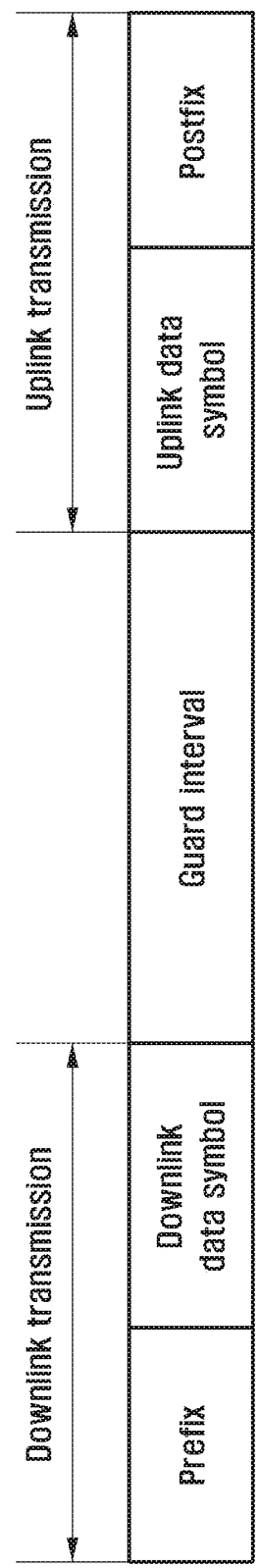
FIG. 15 is a schematic diagram of a possible data symbol structure for time division duplex (TDD) mode according to an embodiment of the present disclosure.

FIG. 15 is a schematic diagram of a possible data symbol structure for TDD mode according to an embodiment of the present disclosure.

Referring to FIG. 15, in one downlink transmission symbol before the guard interval, only a cyclic prefix is added, to offset the ISI from the previous data symbol to this symbol, and in one uplink transmission symbol after the guard interval, only a cyclic postfix is added, to offset the ISI from the next data symbol to this symbol. The transmitter informs the receiver of the specific configuration information along with the frame structure by a PDCCH, PDSCH or PBCH. The receiver adjusts the frame structure and the specific symbol structure according to this information to transmit and receive data.

One embodiment of the present disclosure further provides a communication method based on signal adjustment, comprising: by a terminal equipment, adjusting length of a cyclic prefix and/or a cyclic postfix of a corresponding sub-band, according to the received system information in combination with total length of the cyclic prefix and the cyclic postfix detected during downlink synchronization, and performing communication with a base station equipment through signals with the adjusted length of the cyclic prefix and/or length of the cyclic postfix from the respective sub-band.

In an implementation, the system information comprises sub-band bandwidth and sub-carrier spacing of the respective sub-band.

Wherein, the adjusting, by a terminal equipment, length of a cyclic prefix and/or a cyclic postfix of a corresponding sub-band, according to the received system information in combination with total length of the cyclic prefix and the cyclic postfix detected during downlink synchronization, comprises: determining length information of the cyclic prefix and/or the cyclic postfix according to the sub-band bandwidth and sub-carrier spacing of the respective sub-band, and adjusting length of the cyclic prefix and/or the cyclic postfix corresponding to the corresponding sub-band, according to the length information of the cyclic prefix and/or the cyclic postfix in combination with total length of the cyclic prefix and the cyclic postfix detected during downlink synchronization.

Optionally, the length information comprises at least one of the following length of a cyclic prefix, length of a cyclic postfix, a ratio of length of a cyclic prefix to length of a cyclic postfix, a ratio of length of a cyclic prefix to total length of the cyclic prefix and a cyclic postfix, and a ratio of length of a cyclic postfix to total length of a cyclic prefix and the cyclic postfix.

In an implementation, the adjusting, by a terminal equipment, length of a cyclic prefix and/or a cyclic postfix of a corresponding sub-band, according to the received system information in combination with total length of the cyclic prefix and the cyclic postfix detected during downlink synchronization, comprises: determining location information of a receiver detection window corresponding to the corresponding sub-band bandwidth and sub-carrier spacing, according to the received system information, and adjusting length of the cyclic prefix and/or the cyclic postfix of the corresponding sub-band, according to the location information of the receiver detection window in combination with total length of the cyclic prefix and the cyclic postfix detected during downlink synchronization.

In an implementation, the method further comprises: adjusting, by the terminal equipment, length of a cyclic prefix and/or length of a cyclic postfix correspondingly, according to the adjustment amount of length of the cyclic prefix and/or length of the cyclic postfix received from the base station equipment.

In an implementation, the receiving of the adjustment amount of length of the cyclic prefix and/or length of the cyclic postfix received from the base station equipment comprises at least one of by the terminal equipment, deciding whether length of a cyclic prefix and/or a cyclic postfix is required to be adjusted according to result of channel estimation, if so, transmitting an adjustment request to the base station equipment, and receiving the adjustment amount of length of the cyclic prefix and/or length of the cyclic postfix fed back by the base station equipment for responding to the adjustment request, and receiving the adjustment amount of length of the cyclic prefix and/or length of the cyclic postfix, which is determined and transmitted by the base station equipment based on the degree of channel frequency selective fading fed back by the base station equipment.

In an implementation, the method further comprises by the base station equipment, deciding whether to adjust length of a cyclic prefix and/or a cyclic postfix, according to the received degree of channel frequency selective fading fed back by the user equipment, and if so, transmitting the adjustment amount of length of the cyclic prefix and/or length of the cyclic postfix to the user equipment.

One embodiment of the present disclosure further provides a communication method based on signal adjustment, comprising by a base station equipment, transmitting system information containing length information of a cyclic prefix and/or a cyclic postfix corresponding to a respective sub-band, and performing communication with a user equipment through signals satisfying the length information of the cyclic prefix and/or the cyclic postfix corresponding to the respective sub-band.

Embodiment 5

A signaling informing flow of a flexibly-configured F-OFDM system will be described in this embodiment. The system configurations are as those described in the first specific embodiment of the present disclosure, F-OFDM is used as a multi-carrier modulation mode, and the used time-domain filter is obtained by the soft truncation of a sinc filter with a window function. The entire bandwidth is divided into multiple sub-bands by the system according to service requirements or other factors, and the different sub-bands use the same or different carrier modulation parameters, for example, sub-carrier spacing, and the like.

Figure 16:
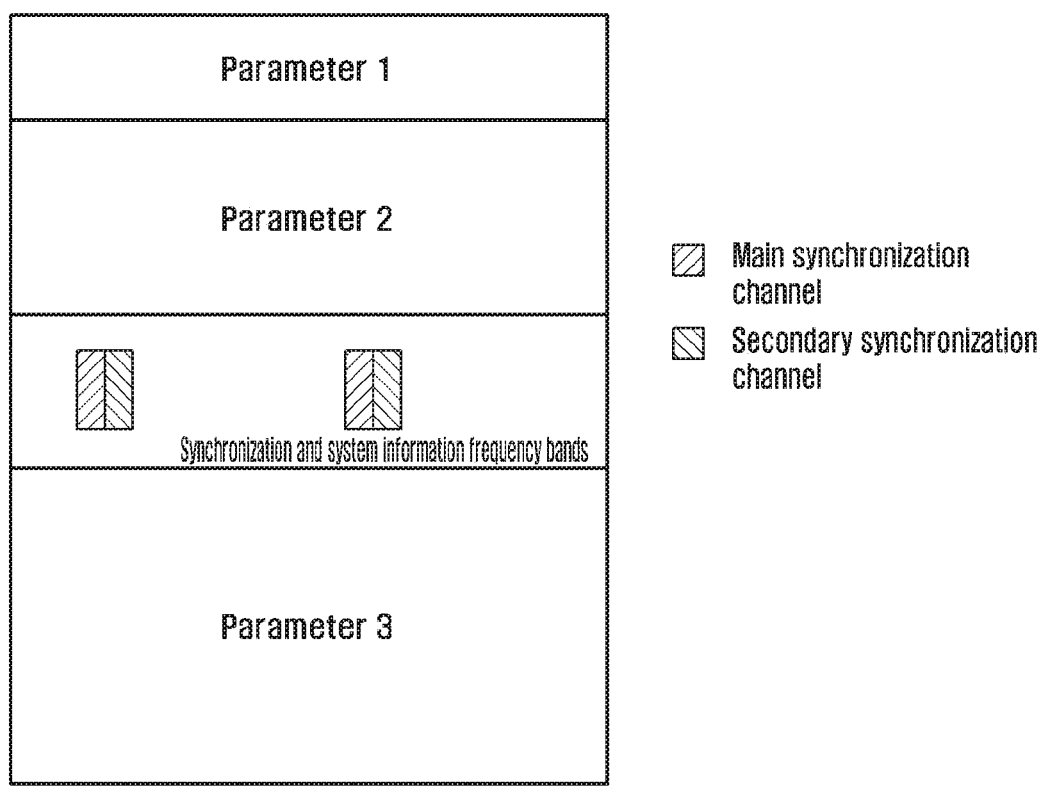
FIG. 16 is a schematic diagram of allocation of a system frequency band and location of a synchronization channel according to a fifth specific embodiment of the present disclosure.

FIG. 16 is a schematic diagram of allocation of a system frequency band and location of a synchronization channel according to a fifth specific embodiment of the present disclosure.

Referring to FIG. 16, the sub-bands using different carrier modulation parameters share a same synchronization channel for performing downlink synchronization and reading system parameters when UE is accessed are illustrated. The synchronization channel comprises a main synchronization channel and a secondary synchronization channel, which can be located in the center of the system bandwidth or in other positions of the system bandwidth. But the symbols bearing the sub-bands of the synchronization channel are configured by a cyclic prefix and a cyclic postfix known to both the user equipment (UE) and the base station. For example, the symbols with the synchronization channel only use a cyclic prefix (that is, traditional F-OFDM), or a ratio of length of a cyclic prefix to length of a cyclic postfix is 3:1 (that is, length of a cyclic prefix is 75% of total length of the cyclic prefix and the cyclic postfix). The cyclic prefix and the cyclic postfix in the synchronization channel are mainly configured to help the UE to determine total length of the cyclic prefix and the cyclic postfix (total length of carrier modulation redundancy), and a reference location of a receiver detection window. Meanwhile, a broadcast channel bearing a master information block (MIB) and some system information blocks (SIB) are also in this band.

System information MIBs or SIBs contain length information of a cyclic prefix and a cyclic postfix corresponding to the respective sub-band bandwidth. The length information can be represented by at least one of the following information: length of a cyclic prefix, length of a cyclic postfix, a ratio of length of a cyclic prefix to length of a cyclic postfix, a ratio of length of a cyclic prefix to total length of a cyclic prefix and a cyclic postfix, a ratio of length of a cyclic postfix to total length of a cyclic prefix and a cyclic postfix, and the number of fronted or retroposed samples of a receiver detection window. This information can be transmitted by the MIB, that is, a new field, which is used for presenting the length information of the cyclic prefix and the cyclic postfix, is added to the MIB. Or, this information is transmitted by the SIB, that is, a new field, which is used for presenting the length information of the cyclic prefix and the cyclic postfix, is added to the SIB. Considering that the type of the sub-band bandwidth and length of a cyclic prefix/a cyclic postfix supported by the system are relatively limited, only a small number of bits are required to complete informing of the length information of the cyclic prefix/the cyclic postfix.

The informing way can be implicit. For example, the UE is informed of length of the cyclic prefix/the cyclic postfix by a lookup table. Possible lengths of the cyclic prefix/the cyclic postfix corresponding to the sub-band bandwidth and carrier modulation parameters are made into a lookup table. In this way, during the informing, indexes in the corresponding lookup table are informed.

The informing way can also be explicit informing. For example, the required length of the cyclic prefix/the cyclic postfix is quantized, and the UE is informed of a format for the quantization in advance through the broadcast channel or the downlink control channel. In this way, the quantized length of the cyclic prefix/the cyclic postfix is informed during the informing of the length of the cyclic prefix/the cyclic postfix.

Considering that length of a symbol is different when the sub-carrier spacing is different, the corresponding length of the cyclic redundancy, i.e., the total length of a cyclic prefix and a cyclic postfix, is also different. In general, the length of the cyclic redundancy changes proportionally as the length of the symbol changes. For example, if the sub-carrier spacing is doubled, the corresponding time-domain symbol is shortened by half, and the length of cyclic redundancy can also be shortened by half. This processing method is applicable to a case in which the carrier frequency changes. For example, for a millimeter wave communication system with a high carrier frequency, its sub-carrier spacing is large. However, considering that multipath time delay of the channel will be less when the carrier frequency is higher, a short cyclic redundancy length can be selected. If the carrier frequency is low, the length of cyclic redundancy should take cell radius and other factors into consideration when the length of the time-domain symbol is reduced by enlarging the sub-carrier spacing. The length of cyclic redundancy may not change proportionally with the length of time-domain symbols.

Figure 17:
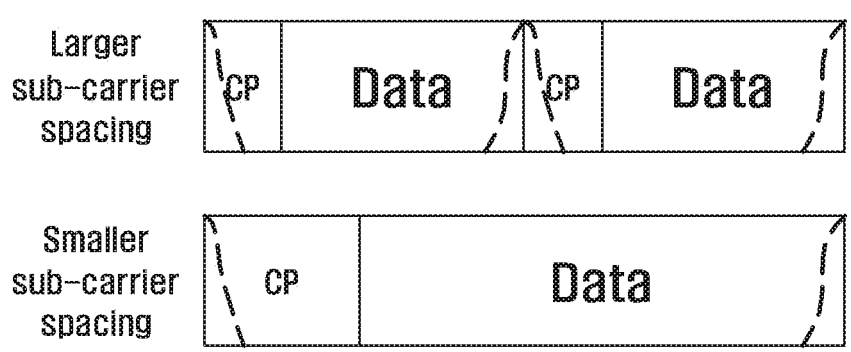
FIG. 17 is a schematic diagram of inter-symbol interference (ISI) of different sub-carrier spacing according to the fifth specific embodiment of the present disclosure.

The symbols with different lengths of time-domain symbols are also differentially sensitive to ISI resulted from time-domain filtering, as shown in FIG. 17.

FIG. 17 is a schematic diagram showing ISI at a large sub-carrier spacing (an upper half of the figure) and a small sub-carrier spacing (a lower half of the figure), respectively according to an embodiment of the present disclosure.

Figure 18:
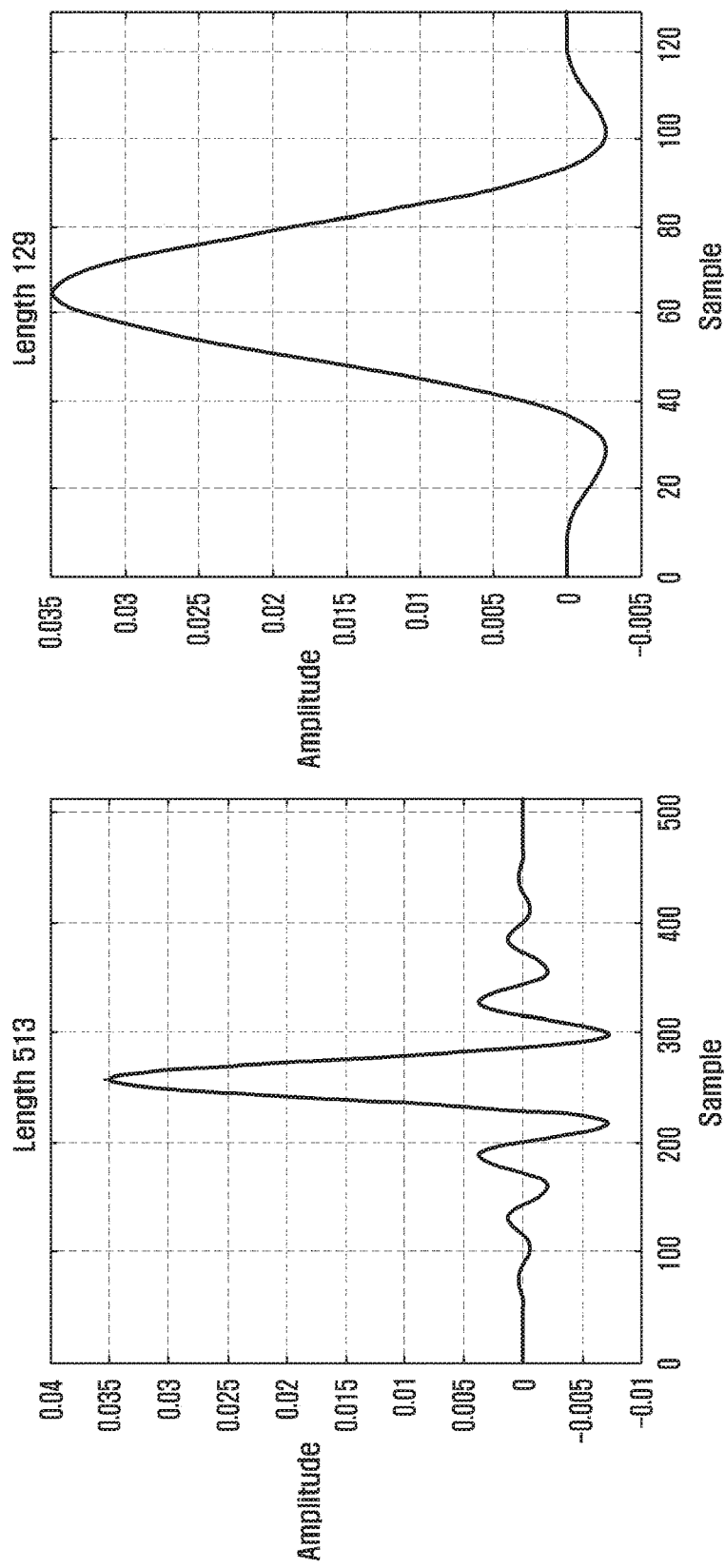
FIG. 18 is a schematic diagram of filter characteristics when a bandwidth is consistent and a length of symbols changes proportionally, according to the fifth specific embodiment of the present disclosure.

Referring to FIG. 17, if the sub-band bandwidth is the same, the time-domain filtering characteristics are basically the same, that is, the degree of energy concentration of the time-domain filter is consistent, as shown in FIG. 18.

FIG. 18 shows amplitude characteristics of a time-domain filter when bandwidth is consistent and a length of the time-domain filter changes proportionally with a sub-carrier spacing according to an embodiment of the present disclosure.

Referring to FIG. 18, although the length of the filter changes, the main energy is still concentrated in 80 samples. Since the time-domain symbol is shortened, the ratio of samples influenced by ISI due to time-domain filtering is increased, and the influence of the ISI on the performance becomes more serious. Hence, even if the bandwidth is consistent, the ISI due to filtering will be influenced by changing carrier modulation parameters (sub-carrier spacing). In general, the larger the sub-carrier spacing is, the smaller the time-domain length of the symbol is, and the larger the influence of the ISI is. In this way, a required ratio of a cyclic prefix to a cyclic postfix is closer to 0.5.

When determining and informing length of a cyclic prefix and length of a cyclic postfix, it is required to consider both sub-band bandwidth and sub-carrier spacing. One possible way is as follows: only defining a ratio of a limited number of cyclic prefixes to cyclic postfixes as a serial numbering of each possible ratio of length of a cyclic prefix to length of a cyclic postfix (or a ratio of length of a cyclic prefix to total length of redundancy, or a ratio of length of a cyclic postfix to total length of redundancy), during the informing by the system information, setting a corresponding ratio of length of a cyclic prefix to length of a cyclic postfix for each sub-carrier spacing and sub-band bandwidth, and informing the UE by the indexes. For the UE, it is only required to store a ratio of length of a cyclic prefix to length of a cyclic postfix required by the sub-band bandwidth and sub-carrier spacing supported by the UE itself. The UE obtains length of the used cyclic prefix and length of the used cyclic postfix according to length of redundancy obtained from blind detection of the synchronization channel and a ratio of length of a cyclic prefix to length of a cyclic postfix corresponding to the sub-band bandwidth and sub-carrier spacing, and performs the receipt and transmission of data.

Another possible informing way is as follows: quantizing length of a cyclic prefix and length of a cyclic postfix corresponding to each sub-band bandwidth and each sub-carrier spacing, and informing the UE of the quantized value.

For downlink synchronization, the UE completes downlink synchronization by using the main synchronization channel and the secondary synchronization channel, to acquire downlink data transmission frame structure and transmission timing of the system. Meanwhile, the UE can perform blind detection to obtain total length of a cyclic prefix and a cyclic postfix (total length of carrier modulation redundancy) by the detection of the main synchronization channel and the secondary synchronization channel, and determine to receive initial location of the receiver detection window of a carrier modulated symbol located in a same bandwidth as the synchronization channel. The schematic flowchart is as shown in FIG. 19.

Figure 19:
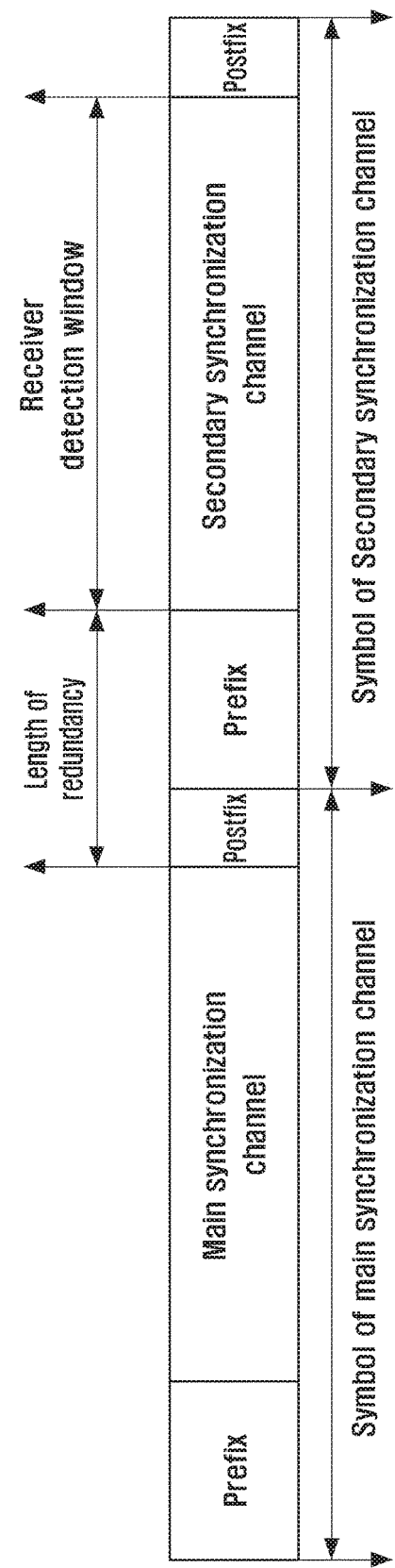
FIG. 19 is a schematic diagram of redundant length detection according to the fifth specific embodiment of the present disclosure.

FIG. 19 is a schematic diagram of redundant length detection according to the fifth specific embodiment of the present disclosure.

Referring to FIG. 19, a cyclic prefix and a cyclic postfix are added to a sub-band where the synchronization channel is located, and the UE can detect total length of the cyclic prefix and the cyclic postfix during detection, and determine the location of an FFT detection window of the receiver by the length.

After determining the carrier modulation parameters of the sub-band, the system information, including an MIB borne by the broadcast channel and an SIB located in the sub-band, is read from the sub-band. The system information contains random access information and length information of the cyclic prefix/the cyclic postfix corresponding to different carrier modulation parameters (sub-carrier spacing). Length of a cyclic prefix and length of a cyclic postfix corresponding to a respective sub-band bandwidth are determined according to the information in combination with length of redundancy detected during downlink synchronization, and locations of the receiving band and the detection window are adjusted to perform the receipt and transmission of data.

Figure 20:
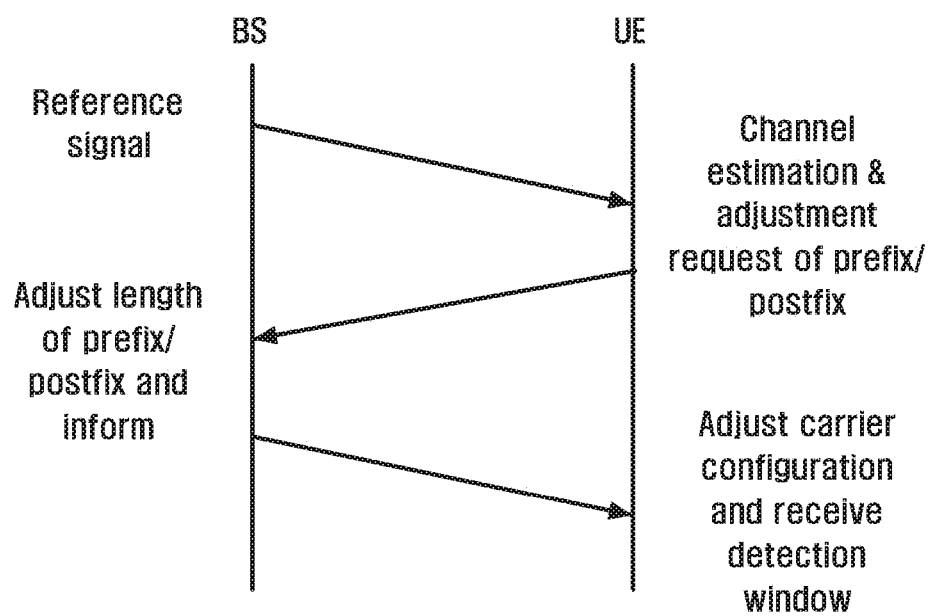
FIG. 20 is a flowchart of initially determining length of a cyclic prefix/a cyclic postfix according to the fifth specific embodiment of the present disclosure.

FIG. 20 is a flowchart of determining length of a cyclic prefix/a cyclic postfix by a synchronization channel according to an embodiment of the present disclosure.

Referring to FIG. 20, taking the addition of a cyclic prefix only to a symbol bearing the system information sub-band as an example, during the downlink synchronization, the UE can detect total length of the carrier modulation redundancy, i.e., length of a cyclic prefix. By reading the system information, the cyclic prefix and the cyclic postfix corresponding to the carrier modulation parameters (sub-carrier spacing) used by the UE can be acquired, and the receiver detection window is adjusted correspondingly. Or, the system information implicitly informs the UE of length of a cyclic prefix and length of a cyclic postfix by informing the adjustment amount of the detection window, and in this case, the UE directly adjusts the location of the detection window according to this information.

The system information contains random access information. The random access channel can be located in the sub-band bearing the synchronization channel and system information, or the sub-bands with different carrier modulation parameters (sub-carrier spacing) use respective random access channels, or a combination of the both ways. If the random access channel is located in the sub-band bearing the system information, a carrier modulation configuration which is the same as that for the synchronization channel/broadcast channel is used, including the sub-carrier spacing and the length of the cyclic prefix/the cyclic postfix. In this example, the random access process is performed by adding a cyclic prefix only, comprising the transmission of a random access preamble sequence and the receipt and transmission of subsequent information. In the case where sub-bands with different carrier modulation parameters use respective random access channels, a preamble sequence symbol is constructed according to the configuration status of the cyclic prefix/the cyclic postfix of the corresponding sub-band, and the location of time-frequency resources of the random access channel is determined by the system information, the initial location of the detection window is determined, the random access process is performed, comprising the transmission of a random access preamble sequence and the receipt and transmission of subsequent information.

After the random access process is completed, the UE performs data communication with the base station by using the carrier modulation parameters and length of the cyclic prefix/the cyclic postfix of the sub-band on the sub-band allocated by the base station.

The above signaling flow describes a way of determining length of a cyclic prefix/a cyclic postfix when the UE is accessed. In this process, the length of a cyclic prefix/a cyclic postfix is mainly determined by the sub-band bandwidth. In the actual communication environment, since the ISI will be influenced by delay spread caused by multipath and other factors, the length of the cyclic prefix/the cyclic postfix is influenced. In this case, it is required to dynamically adjust the length of the cyclic prefix/the cyclic postfix according to conditions of the channel, and the specific process is as shown in FIG. 21.

Figure 21:
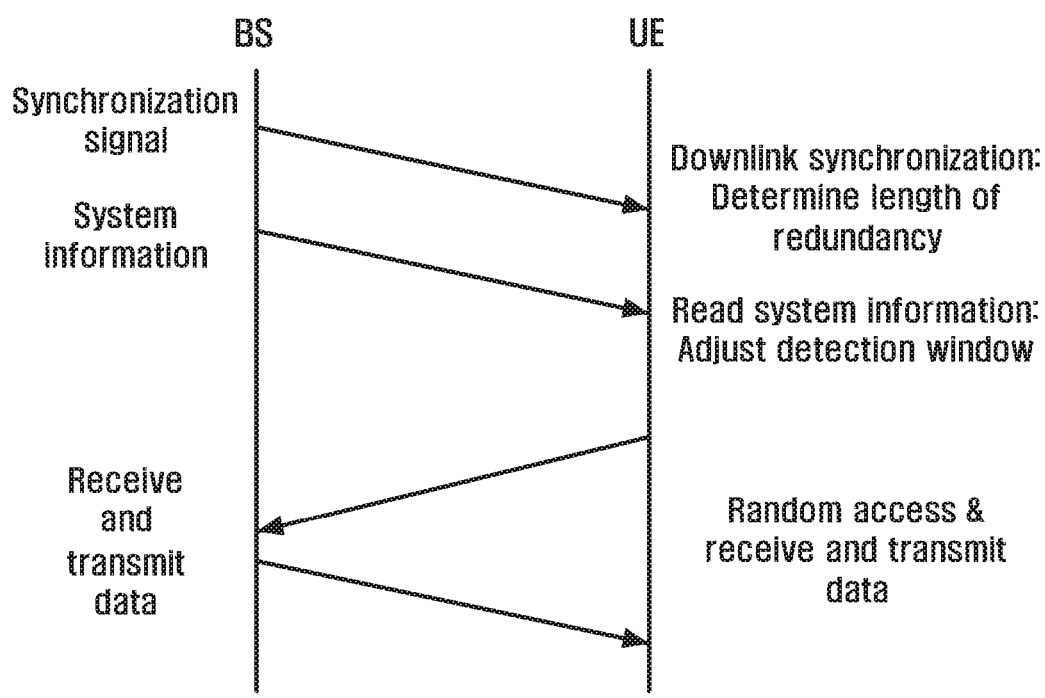
FIG. 21 is a schematic diagram of dynamically adjusting length of a cyclic prefix/a cyclic postfix according to the fifth specific embodiment of the present disclosure.

FIG. 21 is a schematic diagram of dynamically adjusting length of a cyclic prefix/a cyclic postfix according to the fifth specific embodiment of the present disclosure.

Referring to FIG. 21, when the downlink data is transmitted, the base station will insert a reference signal into the downlink data, the reference signal being used for the UE to perform channel estimation on the downlink channel. After performing channel estimation, the UE estimates the size of channel delay experienced by the UE itself (which can be represented by the degree of channel frequency selective fading), and decides whether to adjust a ratio of a cyclic prefix to a cyclic postfix. If so, an adjustment request, which is represented by an expected ratio of the cyclic prefix to the cyclic postfix, is transmitted in the uplink channel. After receiving the request, the base station adjusts length of a cyclic prefix/a cyclic postfix, and informs the UE of the adjustment of the length of the cyclic prefix/the cyclic postfix and the adjustment amount by the downlink control channel. After receiving the adjustment notification and adjustment amount, the UE adjusts the carrier configuration and the location of the receiver detection window. Since the total length of redundancy is fixed, the decrease of length of a prefix means the increase of length of a postfix, and the increase of length of a prefix means the decrease of length of a postfix. Hence, it is only required to inform increased/decreased amount of length of the prefix or length of the postfix.

Another way for dynamic adjustment is as follows: the UE feeds back the representations (such as delay spread or coherent bandwidth) of the degree of channel frequency selective fading in the uplink control channel or the uplink channel, and the base station decides whether to adjust length of a cyclic prefix/a cyclic postfix according to the degree of channel frequency selective fading fed back by the UE. If so, the UE is informed in the downlink control channel.

For the UE operating in a TDD mode, the base station can estimate the degree of frequency selective fading of the uplink channel, according to reference signals, such as an SRS in the uplink channel, and further, estimate the level of the ISI caused by the channel, judge whether to adjust length of a cyclic prefix/cyclic postfix, and inform the UE by the downlink control channel.

In the case where there are various carrier modulation parameters, including sub-carrier spacing, on a same carrier frequency, the following situation may occur: the base station changes the sub-band bandwidth and sub-carrier spacing of the UE during scheduling. For example, when a frequency band with a sub-carrier spacing 1 is under heavy load, while a frequency band with a sub-carrier spacing 2 is under light load and resources have not been used completely, the base station can select to schedule part of UEs served in the frequency band with the sub-carrier spacing 1 to the frequency band with the sub-carrier spacing 2 when next scheduling.

In this case, changing the sub-carrier spacing and sub-band bandwidth can result in the change in the ISI due to filtering, and it is then required to reconfigure length of a cyclic prefix and length of a cyclic postfix. One possible informing way is as follows: the base station informs the UE of length (or a ratio of length) of a cyclic prefix and a cyclic postfix while informing the sub-band and sub-carrier spacing. The notification may comprise two parts: the first part is a reference ratio of length of a cyclic prefix to length of a cyclic postfix corresponding to the sub-band bandwidth and sub-carrier spacing, and the second part is an adjustment value of a ratio of a cyclic prefix to a cyclic postfix according to the previous estimation of the transmission channel. The UE combines the two parts to obtain the sub-band bandwidth and sub-carrier spacing, and a value or an absolute value of a ratio of a cyclic prefix to a cyclic postfix in the current transmission environment.

Another informing way is as follows: the base station directly quantifies length or a ratio of length of a cyclic prefix and a cyclic postfix, and informs the UE of the quantized value while informing the sub-band bandwidth and sub-carrier spacing.

A third informing way is as follows the base station only informs the UE of the change in the sub-band bandwidth and sub-carrier spacing, the UE acquires length or a ratio of length of a cyclic prefix to a cyclic postfix corresponding to the sub-band bandwidth and sub-carrier spacing from the broadcast channel, system information or downlink control channel, and performs the receipt and transmission of data after adjusting the length of the cyclic prefix and the cyclic postfix, and the base station dynamically adjusts the length of the cyclic prefix and cyclic postfix according to channel feedback from the UE, and informs the UE of this adjustment.

Figure 22:
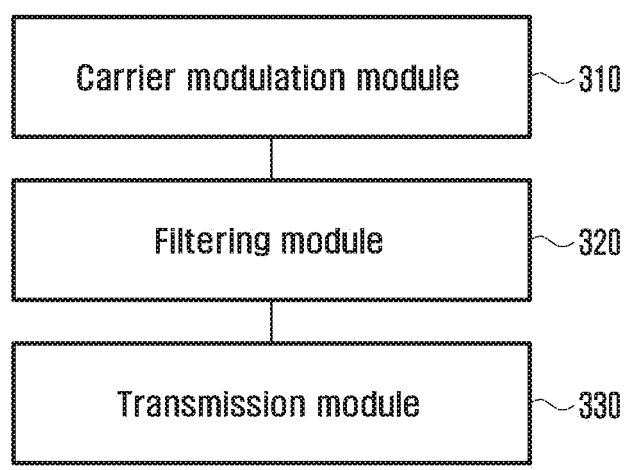
FIG. 22 is a schematic structure diagram of a filtering-based transmitter according to one embodiment of the present disclosure.

FIG. 22 is a schematic structure diagram of a filtering-based transmitter according to one embodiment of the present disclosure.

Referring to FIG. 22, the transmitter comprises a carrier modulation module 310, a filtering module 320 and a transmission module 330.

The carrier modulation module 310 is configured to perform carrier modulation on each signal from one or more sub-bands, and add a cyclic prefix and a cyclic postfix thereto, respectively.

Specifically, the carrier modulation module 310 performs carrier modulation on a signal from each sub-band according to a carrier modulation parameter corresponding to each sub-band, and adds a cyclic prefix and a cyclic postfix thereto, respectively.

The carrier modulation parameter comprises but is not limited to: sub-carrier spacing, length of a cyclic prefix, length of a cyclic postfix, and total length of a cyclic prefix and a cyclic postfix.

The method of carrier modulation comprises but is not limited to:

OFDM and SC-FDMA.

In an implementation, the carrier modulation module 310 performs carrier modulation on the coded and modulated signal from each sub-band according to a carrier modulation parameter corresponding to each sub-band, and adds a cyclic prefix and a cyclic postfix thereto, respectively.

The carrier modulation parameter comprises at least any one of sub-carrier spacing, length of a cyclic prefix, length of a cyclic postfix, and total length of a cyclic prefix and a cyclic postfix.

In an implementation, carrier modulation is performed on signals from any two of multiple sub-bands by using a same or different carrier modulation parameter, and a cyclic prefix and a cyclic postfix are added thereto, respectively.

In an implementation, the transmitter further comprises a coding and modulation module, and the coding and modulation module performs channel coding and symbol modulation on each input signal from one or more sub-bands, and performs carrier modulation on the coded and modulated signal.

In an implementation, channel coding and symbol modulation are performed on signals from any two of multiple sub-bands with a same or different MCS.

In an implementation, the carrier modulation module 310: according to a first pre-defined symbol number corresponding to length of a cyclic prefix of any sub-band, extracts the last first pre-defined symbol number of symbols in the carrier modulated signal corresponding to the sub-band, and adds, in an order of symbols, the extracted symbols before the carrier modulated signal as a cyclic prefix, and, according to a second pre-defined symbol number corresponding to length of a cyclic postfix of any sub-band, extracts the previous second pre-defined symbol number of symbols in the carrier modulated signal corresponding to the sub-band, and adds, in an order of symbols, the extracted symbols after the carrier modulated signal in an order of symbols as a cyclic postfix.

In an implementation, the transmitter further comprises a first length determination module, and the first length determination module determines length of a cyclic prefix and length of a cyclic postfix according to sub-band bandwidth corresponding to each sub-band, downlink channel state information and symbol modulation.

Optionally, the transmitter comprises a channel state receiving module, and the channel state receiving module receives downlink channel state information corresponding to each sub-band transmitted by a receiver.

Optionally, the transmitter comprises a channel state determination module, and the channel state determination module performs uplink channel estimation, according to a sounding reference signal of each sub-band transmitted by a receiver, to determine uplink channel state information corresponding to each sub-band, and determines downlink channel state information corresponding to each sub-band based on uplink channel state information corresponding to each sub-band.

In an implementation, the transmitter further comprises an indication transmitter, and the indication transmitter transmits indication information of a cyclic prefix and a cyclic postfix to a receiver, wherein the indication information of a cyclic prefix and a cyclic postfix comprises at least any one of a ratio of length of a cyclic prefix to length of a cyclic postfix, a ratio of length of a cyclic prefix to total length of the cyclic prefix and a cyclic postfix, a ratio of length of a cyclic postfix to total length of a cyclic prefix and the cyclic postfix, length of a cyclic prefix, and length of a cyclic postfix, wherein the indication information of a cyclic prefix and a cyclic postfix can be used for determining length of the cyclic prefix and length of the cyclic postfix.

In an implementation, the transmitter further comprises a second length determination module, and the second length determination module receives indication information of a cyclic prefix and a cyclic postfix transmitted by a receiver, and determines length of a cyclic prefix and length of a cyclic postfix according to the indication information of the cyclic prefix and the cyclic postfix and total length of the cyclic prefix and the cyclic postfix.

In an implementation, the transmitter further comprises a length adjustment module, and the length adjustment module adjusts length of a cyclic prefix and length of a cyclic postfix according to the power relationship between carrier modulated symbols.

In an implementation, when the power of a carrier modulated symbol is higher than a pre-defined power threshold of two adjacent carrier modulated symbols thereto, the length adjustment module increases the ratio of length of a cyclic prefix or cyclic postfix on a side, close to a high-power carrier modulated symbol, of the two adjacent carrier modulated symbols, in total length of the cyclic prefix and the cyclic postfix, and when a carrier modulated symbol is not used for data transmission, the length adjustment module increases the ratio of length of a cyclic prefix or cyclic postfix on a side, away from the carrier modulated symbol, of the two adjacent carrier modulated symbols, in total length of the cyclic prefix and the cyclic postfix.

The filtering module 320 is configured to perform time-domain filtering on the signal, added with a cyclic prefix and a cyclic postfix, from each sub-band.

The transmission module 330 is configured to transmit the filtered signal from one or more sub-bands.

In an implementation, when there is only one sub-band, the transmission module 330 directly transmits the filtered signal from the sub-band, and when there are multiple sub-bands, the transmission module 330 superposes the filtered signal from each sub-band, and transmits the superposed signal.

Figure 23:
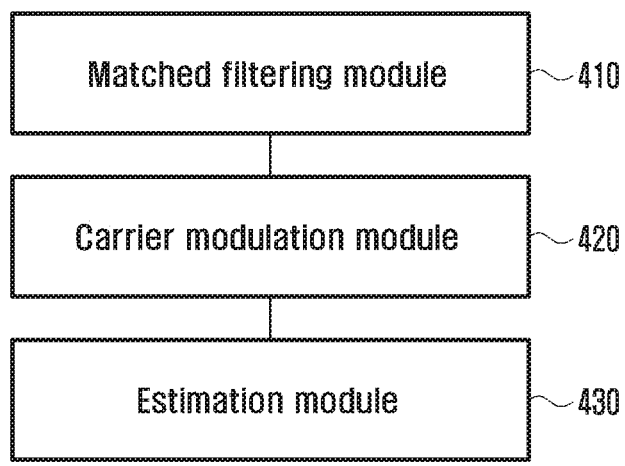
FIG. 23 is a schematic structure diagram of a filtering-based receiver according to one embodiment of the present disclosure.

FIG. 23 is a schematic structure diagram of a filtering-based receiver according to one embodiment of the present disclosure.

Referring to FIG. 23, the receiver comprises a matched filtering module 410, a carrier demodulation module 420 and an estimation module 430.

The matched filtering module 410 is configured to perform time-domain matched filtering, corresponding to one or more sub-bands, on each received signal.

The carrier demodulation module 420 is configured to remove a cyclic prefix and a cyclic postfix from the filtered signal from one or more sub-bands, and performing carrier demodulation.

Specifically, the carrier demodulation module 420 removes a cyclic prefix and a cyclic postfix from the filtered signal from one or more sub-bands according to a carrier modulation parameter corresponding to one or more sub-bands, and performs carrier demodulation.

The carrier modulation parameter comprises at least any one of sub-carrier spacing, length of a cyclic prefix, length of a cyclic postfix, and total length of a cyclic prefix and a cyclic postfix.

In an implementation, the carrier demodulation module 420 extracts by means of windowing, according to length of a cyclic prefix and/or length of a cyclic postfix of one or more sub-bands, a signal removed off a cyclic prefix and a cyclic postfix.

The method of carrier demodulation comprises at least any one of: OFDM and SC-FDMA.

The estimation module 430 is configured to detect and estimate the demodulated signal from one or more sub-bands.

In an implementation, the demodulated signal of one or more sub-bands is detected and estimated according to an MCS corresponding to one or more sub-bands.

Optionally, the receiver further comprises a third length determination module, and the third length determination module determines length of a cyclic prefix and length of a cyclic postfix according to sub-band bandwidth corresponding to one or more sub-bands, downlink channel state information and symbol modulation.

Optionally, the receiver further comprises an indication receiving module and a fourth length determination module, the indication receiving module receives indication information of a cyclic prefix and a cyclic postfix transmitted by a transmitter, and the fourth length determination module determines length of a cyclic prefix and length of a cyclic postfix according to the indication information of the cyclic prefix and the cyclic postfix.

The indication information of a cyclic prefix and a cyclic postfix comprises at least any one of a ratio of length of a cyclic prefix to length of a cyclic postfix, a ratio of length of a cyclic prefix to total length of the cyclic prefix and a cyclic postfix, a ratio of length of a cyclic postfix to total length of a cyclic prefix and the cyclic postfix, length of a cyclic prefix, and length of a cyclic postfix.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A filtering-based signal transmission method comprising:

performing, by a transmitter, carrier modulation on at least one signal from each of at least one sub-band, adding a cyclic prefix and a cyclic postfix to the at least one carrier modulated signal, respectively, a length of the cyclic prefix and a length of the cyclic postfix corresponding to a respective sub-band being determined based on a bandwidth of the respective sub-band;

adjusting, by the transmitter, the length of the cyclic prefix and the length of the cyclic postfix according to a power relationship between carrier modulated symbols adjacent to each other, the carrier modulated symbols corresponding to the at least one carrier modulated signal;

performing, by the transmitter, time-domain filtering on the carrier modulated signal which is added with the cyclic prefix and the cyclic postfix, from the respective sub-band; and transmitting, by the transmitter, the filtered signal from the at least one sub-band, wherein, in response to the carrier modulated symbols adjacent to each other having different power, low-power symbols adjacent to high-power symbols, based on the adjusting, use a different ratio of the length of the cyclic prefix to the length of the cyclic postfix.

2. The method of claim 1, wherein the carrier modulation is based on a carrier modulation parameter corresponding to the respective sub-band, and wherein the carrier modulation parameter comprises at least one of sub-carrier spacing, the length of the cyclic prefix, the length of the cyclic postfix, and a total length of the cyclic prefix and the cyclic postfix.

3. The method of claim 2, further comprising:
determining the length of the cyclic prefix and the length of the cyclic postfix are determined according to downlink channel state information corresponding to the respective sub-band and symbol modulation,
wherein the determining of the downlink channel state information comprises one of:
receiving, by the transmitter, the downlink channel state information corresponding to the respective sub-band that is transmitted by a receiver;
performing an uplink channel estimation, according to a sounding reference signal of the respective sub-band that is transmitted by the receiver, to determine uplink channel state information corresponding to the respective sub-band; and
determining the downlink channel state information corresponding to the respective sub-band, based on the uplink channel state information corresponding to the respective sub-band.

4. The method of claim 3, further comprising:
transmitting, by the transmitter, indication transmission information to the receiver,
wherein the indication transmission information includes at least one of the length of the cyclic prefix, the length of the cyclic postfix, a ratio of the length of the cyclic prefix to the length of the cyclic postfix, the ratio of the length of the cyclic prefix to a total length of the cyclic prefix and the cyclic postfix, and a ratio of the length of the cyclic postfix to the total length, and
wherein the indication transmission information is used for determining the length of a cyclic prefix and the length of a cyclic postfix at the receiver.

5. The method of claim 2, further comprising:
receiving, by the transmitter, reception information from a receiver; and
determining, by the transmitter, the length of the cyclic prefix and the length of the cyclic postfix of the receiver, according to the reception information.

6. The method of claim 5, wherein the adjusting of the length of the cyclic prefix and the length of the cyclic postfix comprises one of:
if a power of a carrier modulated symbol is higher than a pre-defined power threshold of two carrier modulated symbols adjacent to the carrier modulated symbol, increasing a ratio of the length of the cyclic prefix or the cyclic postfix, close to a high-power carrier modulated symbol of the two adjacent carrier modulated symbols, in a total length of the cyclic prefix and the cyclic postfix, or
if a carrier modulated symbol is not used for transmission of data, increasing the ratio of the length of the cyclic prefix or the cyclic postfix, away from the high-power carrier modulated symbol of the two adjacent carrier modulated symbols, in the total length of the cyclic prefix and the cyclic postfix.

7. A communication method based on signal adjustment, the communication method comprising:
receiving system information including a bandwidth corresponding to each of at least one sub-band;
determining, by a terminal, a length of a cyclic prefix and a length of a cyclic postfix corresponding to a respective sub-band, based on the bandwidth included in the received system information;
receiving, from a base station, information notifying adjustment amount of the length of the cyclic prefix and the length of the cyclic postfix;
adjusting the determined length of the cyclic prefix and the determined length of the cyclic postfix based on the received information; and
performing communication with the base station using signals with the adjusted length of the cyclic prefix and the adjusted length of the cyclic postfix from the respective sub-band,
wherein the adjustment amount is related to a power relationship between carrier modulated symbols adjacent to each other, the carrier modulated symbols corresponding to at least one carrier modulated signal, and
wherein, in response to the carrier modulated symbols adjacent to each other having different power, low-power symbols adjacent to high-power symbols, based on the adjusting, use a different ratio of the length of the cyclic prefix to the length of the cyclic postfix.

8. The method of claim 7,
wherein the system information further comprises sub-carrier spacing of the respective sub-band,
wherein the determining of the length of the cyclic prefix and the length of the cyclic postfix corresponding to the respective sub-band comprises:
determining length information of the cyclic prefix and the cyclic postfix, according to the sub-band bandwidth and sub-carrier spacing of the respective sub-band; and
adjusting the length of the cyclic prefix and the length of the cyclic postfix corresponding to the respective sub-band, according to the determined length information of the cyclic prefix and the cyclic postfix and a total length, and
wherein the length information comprises at least one of the length of the cyclic prefix, the length of the cyclic postfix, a ratio of the length of the cyclic prefix to the length of the cyclic postfix, the ratio of the length of the cyclic prefix to a total length of the cyclic prefix and the cyclic postfix, and a ratio of the length of the cyclic postfix to the total length.

9. The method of claim 7,
wherein the system information further comprises sub-carrier spacing of the respective sub-band, and
wherein the determining of the length of the cyclic prefix and the length of the cyclic postfix corresponding to the respective sub-band comprises:
determining, by the terminal, location information of a receiver detection window corresponding to the respective sub-band based on the bandwidth and the sub-carrier spacing included in the received system information; and
adjusting, by the terminal, the length of the cyclic prefix and the length of the cyclic postfix corresponding to the respective sub-band according to the location information of the receiver detection window and a total length.

10. The method of claim 7, wherein the received information comprises first adjustment information associated with the length of the cyclic prefix and second adjustment information associated with the length of the cyclic postfix.

11. The method of claim 10, further comprising:
determining, by the terminal, whether the length of the cyclic prefix and the length of the cyclic postfix is required to be adjusted according to a result of a channel estimation; and
if it is determined that adjustment of the length of the cyclic prefix and the length of the cyclic postfix is required, transmitting, by the terminal, an adjustment request to the base station, wherein the received information is determined and transmitted by the base station based on channel frequency selective fading that is fed back by the base station.

12. A method for filtering a signal, the method comprising:
    performing, by a receiver, time-domain matched filtering on each received signal, corresponding to at least one sub-band;
    removing, by the receiver, a cyclic prefix and a cyclic postfix from the filtered signal from the at least one sub-band, and performing carrier demodulation, respectively; and
    detecting and estimating, by the receiver, the demodulated signal from the at least one sub-band,
    wherein a length of the cyclic prefix and a length of the cyclic postfix corresponding to a respective sub-band are determined based on a bandwidth of the respective sub-band,
    wherein the length of the cyclic prefix and the length of the cyclic postfix are adjusted based on information, received from a transmitter, notifying adjustment amount of the length of the cyclic prefix and the length of the cyclic postfix,
    wherein the adjustment amount is related to a power relationship between carrier modulated symbols adjacent to each other, the carrier modulated symbols corresponding to at least one carrier modulated signal, and
    wherein, in response to the carrier modulated symbols adjacent to each other having different power, low-power symbols adjacent to high-power symbols, based on the adjusting, use a different ratio of the length of the cyclic prefix to the length of the cyclic postfix.

13. A method for signal adjustment, the method comprising:
    transmitting, by a base station, system information including length information of a cyclic prefix and a cyclic postfix corresponding to a respective sub-band; and
    performing, by the base station, communication with a terminal using at least one signal with the cyclic prefix and the cyclic postfix corresponding to the respective sub-band,
    wherein the length information is determined based on a bandwidth corresponding to the respective sub-band,
    wherein a length of the cyclic prefix and a length of the cyclic postfix are adjusted according to a power relationship between carrier modulated symbols adjacent to each other, the at least one signal being mapped to the carrier modulated symbols, and
    wherein, in response to the carrier modulated symbols adjacent to each other having different power, low-power symbols adjacent to high-power symbols, based on the adjusting, use a different ratio of the length of the cyclic prefix to the length of the cyclic postfix.

14. A filtering-based transmitter comprising:
    a carrier modulator configured to:
        perform carrier modulation on at least one signal from each of at least one sub-band,
        add a cyclic prefix and a cyclic postfix to the at least one carrier modulated signal, respectively, a length of the cyclic prefix and a length of the cyclic postfix corresponding to a respective sub-band being determined based on a bandwidth of the respective sub-band, and
        adjust the length of the cyclic prefix and the length of the cyclic postfix according to a power relationship between carrier modulated symbols adjacent to each other, the carrier modulated symbols corresponding to the at least one carrier modulated signal;
    a filter configured to perform time-domain filtering on the carrier modulated signal which is added with the cyclic prefix and the cyclic postfix, from the respective sub-band; and
    a transmitter configured to transmit the filtered signal from the at least one sub-band,
    wherein, in response to the carrier modulated symbols adjacent to each other having different power, low-power symbols adjacent to high-power symbols, based on the adjusting, use a different ratio of the length of the cyclic prefix to the length of the cyclic postfix.

15. A filtering-based receiver comprising:
    a matched filter configured to perform time-domain matched filtering on each received signal, corresponding to at least one sub-band;
    a carrier demodulator configured to remove a cyclic prefix and a cyclic postfix from the filtered signal from the at least one sub-band, and perform carrier demodulation, respectively; and
    an estimation device, configured to detect and estimate the demodulated signal from the at least one sub-band,
    wherein a length of the cyclic prefix and a length of the cyclic postfix corresponding to a respective sub-band are determined based on a bandwidth of the respective sub-band,
    wherein the length of the cyclic prefix and the length of the cyclic postfix are adjusted based on information, received from a filtering-based transmitter, notifying adjustment amount of the length of the cyclic prefix and the length of the cyclic postfix,
    wherein the adjustment amount is related to a power relationship between carrier modulated symbols adjacent to each other, the carrier modulated symbols corresponding to at least one carrier modulated signal, and
    wherein, in response to the carrier modulated symbols adjacent to each other having different power, low-power symbols adjacent to high-power symbols, based on the adjusting, use a different ratio of the length of the cyclic prefix to the length of the cyclic postfix.

16. A method by a transmitter in a terminal, the method comprising:
    performing carrier modulation for at least one signal from each of at least one sub-band;
    adding a transmission cyclic prefix and a transmission cyclic postfix to the at least one carrier modulated signal, respectively, a length of the transmission cyclic prefix and a length of the transmission cyclic postfix corresponding to a respective sub-band being determined based on a bandwidth of the respective sub-band;
    adjusting the length of the transmission cyclic prefix and the length of the transmission cyclic postfix according to a power relationship between carrier modulated symbols adjacent to each other, the carrier modulated symbols corresponding to the at least one carrier modulated signal;
    after the adding of the transmission cyclic prefix and transmission cyclic postfix, filtering each carrier modulated signal in a time domain; and
    transmitting, by the transmitter, the filtered signal from the at least one sub-band,
    wherein, in response to the carrier modulated symbols adjacent to each other having different power, low-power symbols adjacent to high-power symbols, based on the adjusting, use a different ratio of the length of the cyclic prefix to the length of the cyclic postfix.

17. The method of claim 16, further comprising receiving decoding information from a receiver of the terminal, the decoding information including information related to a reception cyclic prefix and a reception cyclic postfix.

18. The method of claim 17, further comprising adjusting the transmission cyclic prefix and the transmission cyclic postfix based on the decoding information.

* * * * *